United States Patent
Okamoto et al.

(10) Patent No.: US 6,230,175 B1
(45) Date of Patent: May 8, 2001

(54) RECONFIGURABLE DIGIT-SERIAL ARITHMETIC SYSTEM HAVING A PLURALITY OF DIGIT-SERIAL ARITHMETIC UNITS

(75) Inventors: Tadashi Okamoto; Hiroshi Kadota; Yoshiteru Mino, all of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/188,388

(22) Filed: Nov. 10, 1998

(30) Foreign Application Priority Data

Nov. 11, 1997 (JP) ...................................... 9-308197

(51) Int. Cl.[7] .............................. G06F 15/31; G06F 3/14; G06F 7/38; G06F 11/16
(52) U.S. Cl. .......................... 708/319; 708/319; 708/166; 708/409; 700/4
(58) Field of Search ..................................... 708/409, 605, 708/319, 166; 710/71; 712/300; 700/4

(56) References Cited

U.S. PATENT DOCUMENTS

| | | | |
|---|---|---|---|
| 3,742,456 | * 6/1973 | McFiggans et al. | 710/71 |
| 4,905,175 | 2/1990 | Corbett et al. | 708/209 |
| 4,910,700 | 3/1990 | Hartley et al. | 708/627 |
| 4,951,221 | 8/1990 | Corbett et al. | 716/17 |
| 5,016,011 | 5/1991 | Hartley et al. | 341/59 |
| 5,025,257 | 6/1991 | Hartley et al. | 341/101 |
| 5,034,908 | 7/1991 | Hartley et al. | 708/319 |
| 5,034,909 | 7/1991 | Hartley | 708/320 |
| 5,084,834 | 1/1992 | Hartley et al. | 708/707 |
| 5,113,363 | 5/1992 | Orsino et al. | 708/523 |
| 5,293,558 | * 3/1994 | Narita et al. | 708/605 |
| 5,798,955 | * 8/1998 | Matsubara | 708/409 |
| 5,835,793 | * 11/1998 | Li et al. | 712/300 |

FOREIGN PATENT DOCUMENTS

| | | |
|---|---|---|
| 2-157934 | 6/1990 | (JP) . |
| 2-244329 | 9/1990 | (JP) . |
| 8-202529 | 8/1996 | (JP) . |
| 10-111790 | 4/1998 | (JP) . |

* cited by examiner

*Primary Examiner*—Daniel H. Pan
*Assistant Examiner*—Te(Susan) Chen
(74) *Attorney, Agent, or Firm*—Eric J. Robinson; Nixon Peabody LLP

(57) ABSTRACT

A bus for data transmission, bus switches for slicing the bus, and four arithmetic blocks are provided to perform a series of fixed-point arithmetic operations. Each of the four arithmetic blocks has a plurality of digit-serial arithmetic units, namely a multiplier, an adder/subtracter, and a shifter. Each of the digit-serial arithmetic units has the functions of receiving a plurality of input digits representative of an input operand and a digit position indicator of each of the input digits and providing a plurality of result digits representative of an arithmetic result of the input operand and a digit position indicator of each of the result digits to any other one of the plurality of digit-serial arithmetic units. Particularly, the digit-serial adder/subtracter contains therein a selector for input switching so that the digit-serial adder/subtracter can perform butterfly arithmetic.

5 Claims, 15 Drawing Sheets

Fig. 8

|   | C3 | C2 | C1 | C0 |
|---|----|----|----|----|
| + | D3 | D2 | D1 | D0 |
|   | E3 | E2 | E1 | E0 |

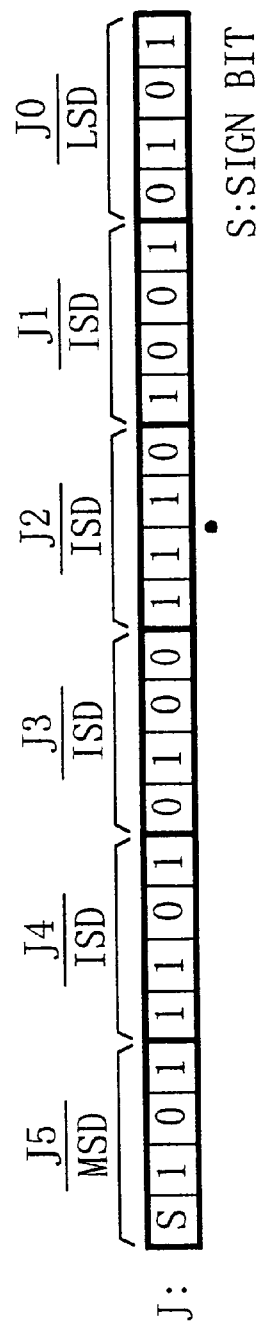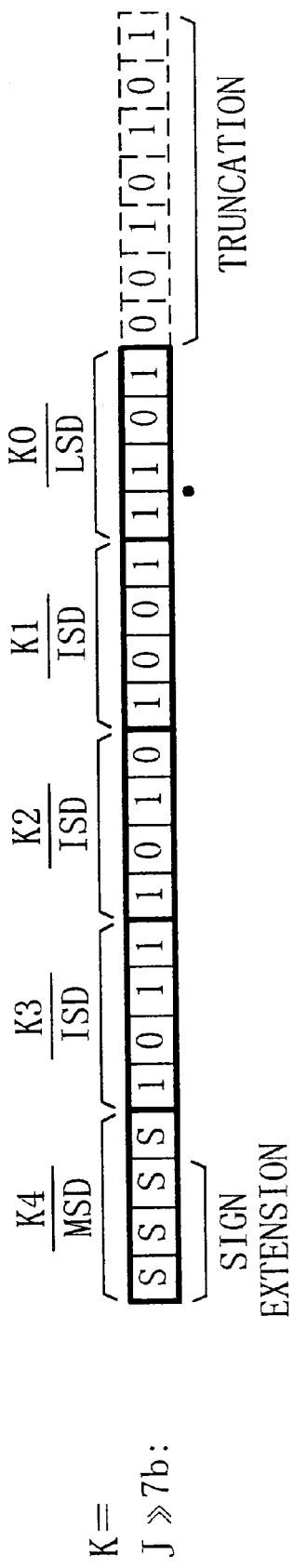

RECONFIGURABLE DIGIT-SERIAL ARITHMETIC SYSTEM HAVING A PLURALITY OF DIGIT-SERIAL ARITHMETIC UNITS

BACKGROUND OF THE INVENTION

The present invention relates to a digit-serial arithmetic system.

U.S. Pat. No. 5,016,011 shows a digit-serial arithmetic system in which a data word is partitioned into a plurality of, for example, 4-bit digits. This type of digit-serial arithmetic system has the capability to provide high throughput performance by making use of the advantages of both the word-parallel architecture and the bit-serial architecture.

In digital signal processors (DSPs), it is necessary to carry out operations on various types of words having different numbers of bits. Therefore, in order to realize a digit-serial DSP, it is necessary to make a change in the configuration of the digit-serial DSP according to a change in the number of digits forming a data word. However, the above-described digit-serial arithmetic system is unable to make a change in its configuration with flexibility.

SUMMARY OF THE INVENTION

Accordingly, an object of the present invention is to provide a reconfigurable digit-serial arithmetic system.

In order to achieve the object, the present invention provides a digit-serial arithmetic system having a plurality of digit-serial arithmetic units, in which according to the arithmetic result, the indications of the positions of digits are reset for each digit-serial arithmetic unit for maintaining the concept of the digits. In addition, a network of digit-serial arithmetic units provides programmability.

BRIEF DESCRIPTION OF THE DRAWINGS

FIG. 8 shows an example of a signed addition operation which is performed by the digit-serial adder/subtracter of FIG. 7.

FIG. 13, comprised of FIGS. 13A and 13B, shows an example of a 3-bit left shift operation which is performed by the digit-serial shifter of FIG. 10 wherein

FIG. 14, comprised of FIGS. 14A and 14B, shows an example of a 7-bit right shift operation which is performed by the digit-serial shifter of FIG. 10 wherein FIG. 14A shows input data and FIG. 14B shows a result of the 7-bit right shift operation.

DETAILED DESCRIPTION OF THE INVENTION

Figure 1:
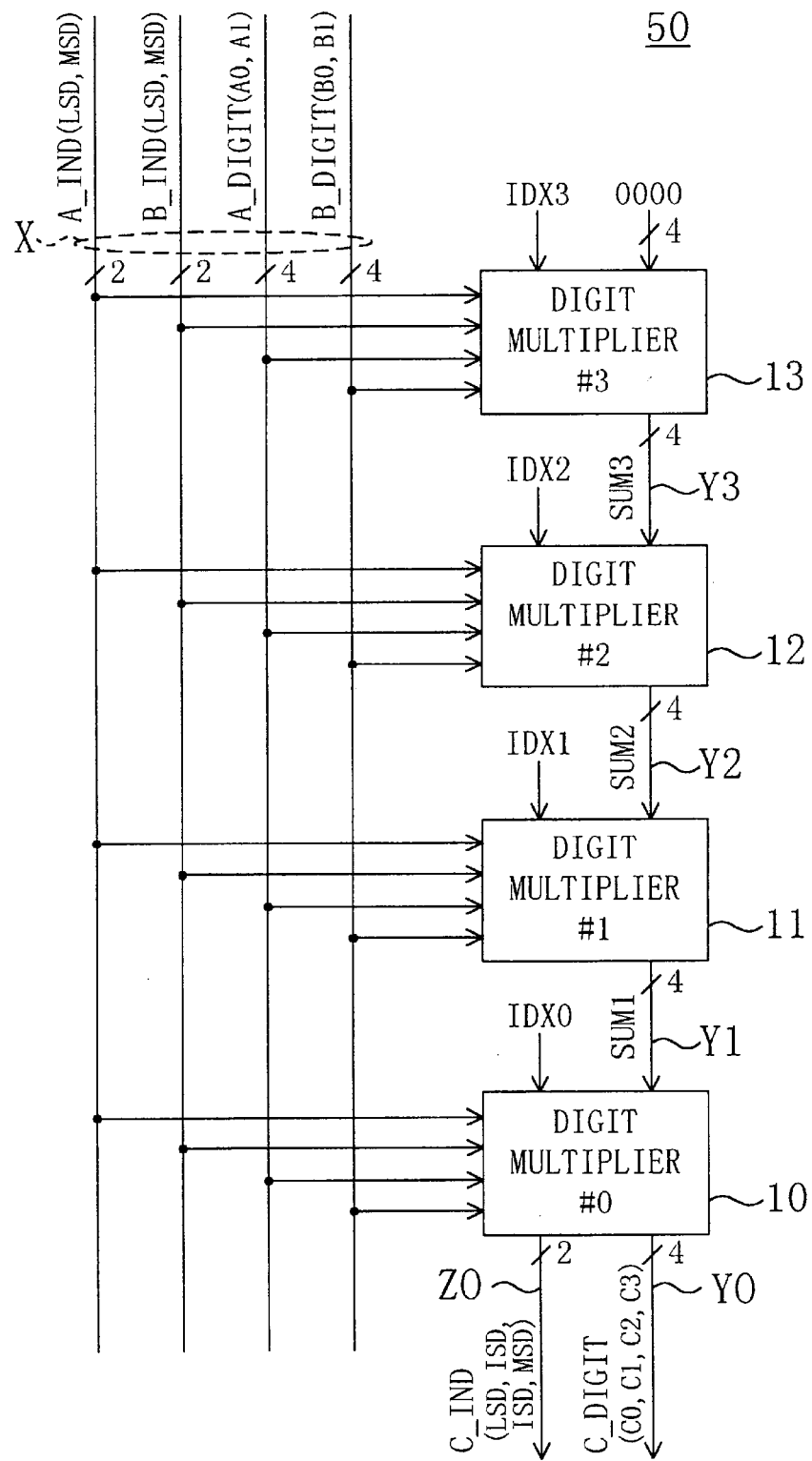
FIG. 1 shows in block diagram form an example of the structure of a digit-serial multiplier in accordance with the present invention.

Prior to providing detailed descriptions of the embodiments of the present invention, a series of arithmetic operations in the digital signal processor is explained by means of example. Discrete cosine transformation (DCT), which is preferably used in image compression encoding, includes the performing of a series of fixed-point arithmetic operations such as those shown below.

$$C(13b.3b)=A(8b.0b) \times B(5b.3b) \tag{1}$$

$$D(8b.3b)=A(8b.0b)<<3b \tag{2}$$

$$E(13b.3b)=C(13b.3b)+D(8b.3b) \tag{3}$$

$$F(13b.3b)=C(13b.3b)-D(8b.3b) \tag{4}$$

$$H(14b.10b)=E(13b.3b) \times G(1b.7b) \tag{5}$$

$$I(14b.10b)=F(13b.3b) \times G(1b.7b) \tag{6}$$

$$J(14b.10b)=H(14b.10b)-I(14b.10b) \tag{7}$$

$$K(14b.3b)=J(14b.10b)>>7b \tag{8}$$

$$L(5b.3b)=\text{trunc}[K(14b.3b)] \tag{9}$$

where the numbers A–L are all fixed-point numbers represented in two's complement format. For example, C(13b.3b) of the expression (1) means that the number C is made up of an integer part which is thirteen bits in length and a fraction part which is three bits in length. The expression (2) shows that prior to performing addition and subtraction shown in the expressions (3) and (4), the number A is left shifted three bit positions to undergo a transformation to the number D. The number D has an integer part corresponding to that of the number A and a fraction part made up of three bits of logical zero. As a result, the number C has a decimal place corresponding to that of the number D. The expression (8) shows that the number J, which has become too long in bit length because of repeatedly carried out multiplication operations, is right shifted seven bit positions to undergo a transformation to the number K. The number K has an integer part corresponding to that of the number J and a fraction part corresponding to the three high order bits of the fraction part of the number J. The remaining seven low order bits of the fraction part of the number J are truncated. The expression (9) shows that the number K, which has come to have an integer part containing therein insignificant bits, is transformed by truncation to the number L. The number L has an integer part corresponding to the five low order bits of the integer part of the number K and a fraction part corresponding to that of the number K. The nine high order bits of the integer part of the number K, all of which are, for example, bits of logical 0, are cut off.

In digit-serial arithmetic systems of the present invention, all numbers are handled in 4-bit digits. Accordingly, D(8b.3b) of the expressions (2)–(4) is replaced by D(9b.3b) of three digits and K(14b.3b) of the expressions (8) and (9) is replaced by K(17b.3b) of five digits, at which moment so-called sign extension is carried out. In other words, the two high order bits of the number D(9b.3b) each correspond to the most significant bit (sign bit) of the number D (8b.3b). The four high order bits of the number K(17b.3b) each correspond to the most significant bit (sign bit) of the number K(14b.3b).

FIG. 1 illustrates a digit-serial multiplier of the present invention. The digit-serial multiplier of FIG. 1 is capable of performing multiplication of the expression (1), namely, C=A×B where the number A is an 8-bit multiplicand, the number B is an 8-bit multiplier, and the number C is a 16-bit product result. The multiplicand A, the multiplier B, and the product result C are all fixed-point numbers represented in two's complement format.

The multiplicand A is made up of a 4-bit low order digit A0 and a 4-bit high order digit A1. The digit A0 is the least significant digit (LSD) of the multiplicand A and the digit A1 is the most significant digit (MSD) of the multiplicand A. A multiplicand digit A_DIGIT of FIG. 1 represents either one of the multiplicand digits A0 and A1 sequentially input to the digit-serial multiplier through a 4-bit multiplicand bus. A multiplicand digit position indicator A_IND of FIG. 1 (which is input to the digit-serial multiplier) provides an indication of whether a multiplicand digit currently present on the multiplicand bus is an LSD or an MSD.

The multiplier B is made up of a 4-bit least significant digit (LSD) B0 and a 4-bit most significant digit (MSD) B1. A multiplier digit B_DIGIT of FIG. 1 represents either one of the multiplier digits B0 and B1 sequentially input to the digit-serial multiplier through a 4-bit multiplier bus. A multiplier digit position indicator B_IND (which is input to the digit-serial multiplier) provides an indication of whether a multiplier digit currently present on the multiplier bus is an LSD or an MSD.

The product result C is made up of a 4-bit least significant digit (LSD) C0, a first 4-bit intermediate significant digit (ISD) C1, a second 4-bit intermediate significant digit (ISD) C2, and a 4-bit most significant digit (MSD) C3. A product result digit C_DIGIT of FIG. 1 represents any one of the product result digits C0–C3 sequentially output from the digit-serial multiplier through a 4-bit product result bus. A product result digit position indicator C_IND (which is output from the digit-serial multiplier) provides an indication of whether a product result digit currently present on the product result bus is an LSD, an ISD, or an MSD. In the structure of FIG. 1, three 2-bit buses are provided, namely a 2-bit bus used to output the product result digit position indicator C-IND, a 2-bit bus used to input the multiplicand digit position indicator A_IND, and a 2-bit bus used to input the multiplier digit position indicator B_IND. Such provision is made in consideration of cases in which the multiplicand A and the multiplier B are made up of three or more digits.

A digit-serial multiplier 50 of FIG. 1 has four digit multipliers 10–13. Each of the digit multipliers 10–13 performs 4 bits×4 bits multiplication. Data X, comprised of the multiplicand digit A_DIGIT, the multiplicand digit position indicator A_IND, the multiplier digit B_DIGIT, and the multiplier digit position indicator B-IND, is input in common to the four digit multipliers 10–13. Index signals IDX0–IDX3 are input to the digit multipliers 10–13 respectively, as a result of which these four digit multipliers 10–13 are identified by indexes 0–3 respectively. The digit multiplier #0 receives a 4-bit partial sum SUM1 from the digit multiplier #1 and provides the product result digit C_DIGIT and the product result digit position indicator C_IND. The digit multiplier #1 receives a 4-bit partial sum SUM2 from the digit multiplier #2 and provides the partial sum SUM1 to the digit multiplier #0. The digit multiplier #2 receives a 4-bit partial sum SUM3 from the digit multiplier #3 and provides the partial sum SUM2 to the digit multiplier #1. The digit multiplier #3 receives a 4-bit binary representation constant ([0 0 0 0]) and provides the partial sum SUM3 to the digit multiplier #2. In some cases in the following description, the product result digit C_DIGIT will be called data Y0, the product result digit position indicator C_IND will be called data Z0, the partial sum SUM1 will be called data Y1, the partial sum SUM2 will be called data Y2, and the partial sum SUM3 will be called data Y3.

Figure 2:
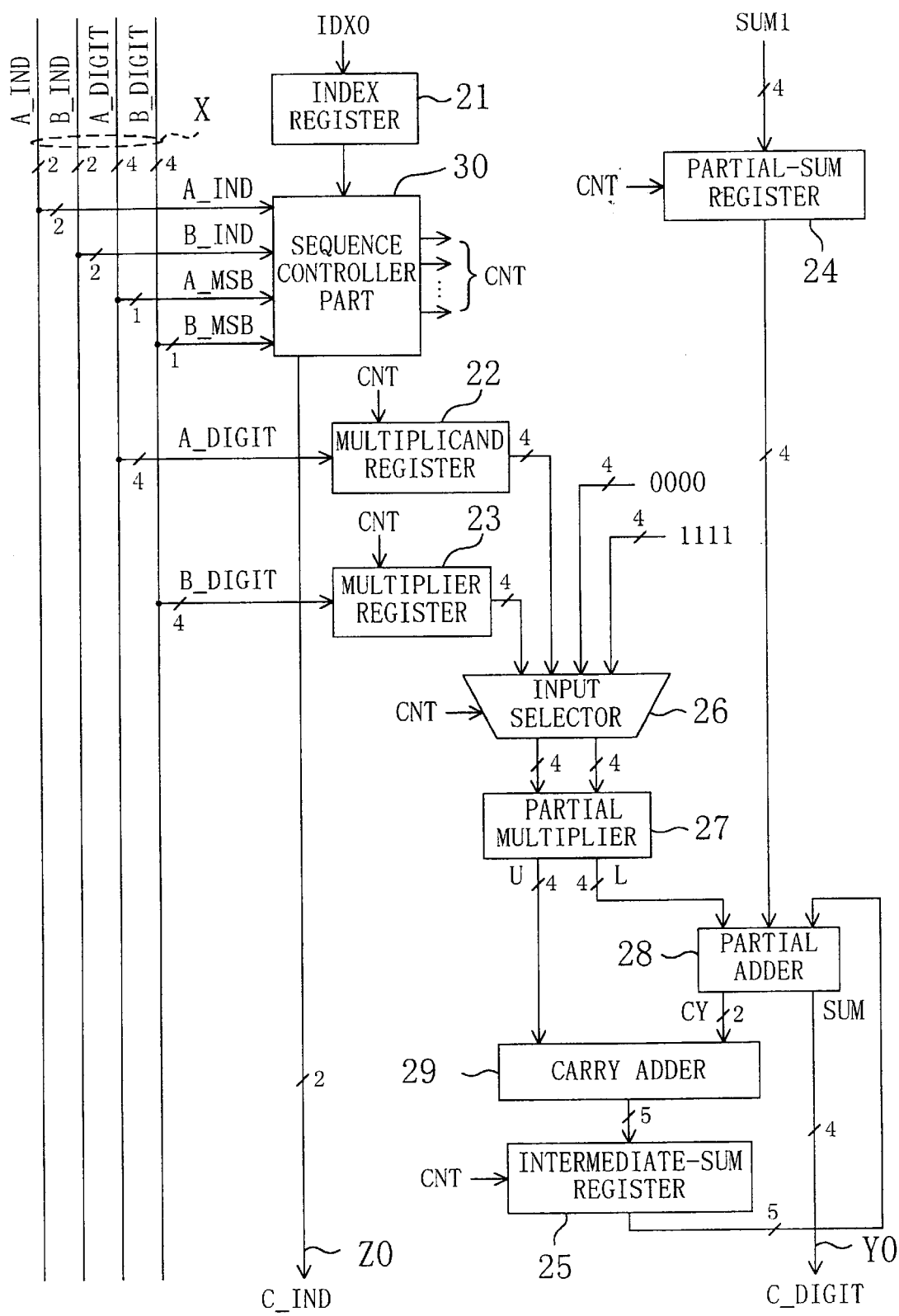
FIG. 2 shows in block diagram form the internal structure of one of four digit multipliers of FIG. 1.

Referring now to FIG. 2, therein shown is the internal structure of the digit multiplier (#0) 10 of FIG. 1. The digit multiplier 10 of FIG. 2 has five registers, namely an index register 21 for storing the index signal IDX0, a multiplicand register 22 for storing the multiplicand digit A_DIGIT, a multiplier register 23 for storing the multiplier digit B_DIGIT, a partial-sum register 24 for storing the partial sum SUM1, and an intermediate-sum register 25 for storing an intermediate sum. In addition to these five registers, the digit multiplier 10 further has an input selector 26, a partial multiplier 27, a partial adder 28, a carry adder 29, and a sequence controller part 30. The input selector 26 is disposed to provide any one of the multiplicand digit A_DIGIT stored in the multiplicand register 22, a 4-bit binary representation constant ([0 0 0 0]), and a 4-bit binary representation constant ([1 1 1 1]) to the partial multiplier 27 as a multiplicand operand, and to provide any one of the multiplier digit B_DIGIT stored in the multiplier register 23, the 4-bit constant ([0 0 0 0]), and the 4-bit constant ([1 1 1 1]) to the partial multiplier 27 as a multiplier operand. The partial multiplier 27 is disposed to multiply a multiplicand operand and a multiplier operand together (i.e. multiplication 4 bits×4 bits) to form a product result which is an 8-bit partial product. The four low order bits (L) of the 8-bit partial product are delivered to the partial adder 28, while the four high order bits (U) of the 8-bit partial product are delivered to the carry adder 29. The partial adder 28 is disposed to perform addition of the four low order bits L delivered from the partial multiplier 27, the partial sum SUM1 stored in the partial-sum register 24, and the intermediate sum stored in the intermediate-sum register 25. This addition operation by the partial adder 28 generates a sum result which is at most six bits in length. The partial adder 28 provides as the product result digit C_DIGIT (the data Y0) a digit SUM made up of the four low order bits of the 6-bit sum result. In addition, the partial adder 28 provides the two high order bits (carry CY) of the 6-bit sum result to the carry adder 29. The carry adder 29 is disposed to perform addition of the four high order bits U from the partial multiplier 27 and the carry CY to form a sum result (intermediate sum result) which is at most five bits in length. Such an intermediate sum result is stored in the intermediate-sum register 25. The sequence controller part 30 receives an index from the index register 21. The sequence controller part 30 makes reference to the most significant bit (A_MSB) of the multiplicand digit A_DIGIT if the multiplicand digit position indicator A_IND provides an MSD indication. If the multiplier digit position indicator B_IND provides an MSD indication, the sequence controller part 30 makes reference to the most significant bit (B_MSB) of the multiplier digit B_DIGIT. In addition to the above functions, the sequence controller part 30 provides a control signal CNT for controlling the latch timing of each of the multiplicand register 22, the multiplier register 23, the partial-sum register 24, and the intermediate-sum register 25 and for controlling the selecting of multiplicand and multiplier operands in the input selector 26. Further, the sequence controller part 30 has the function of generating the product result digit position indicator C_IND (data Z0).

The other three digit multipliers #1–#3 of FIG. 1 are identical in internal structure with the digit multiplier #0. The digit multiplier #0 however differs from the digit multipliers #1–#3 in that it is the only digit multiplier that generates the product result digit position indicator C_IND.

Figure 3:
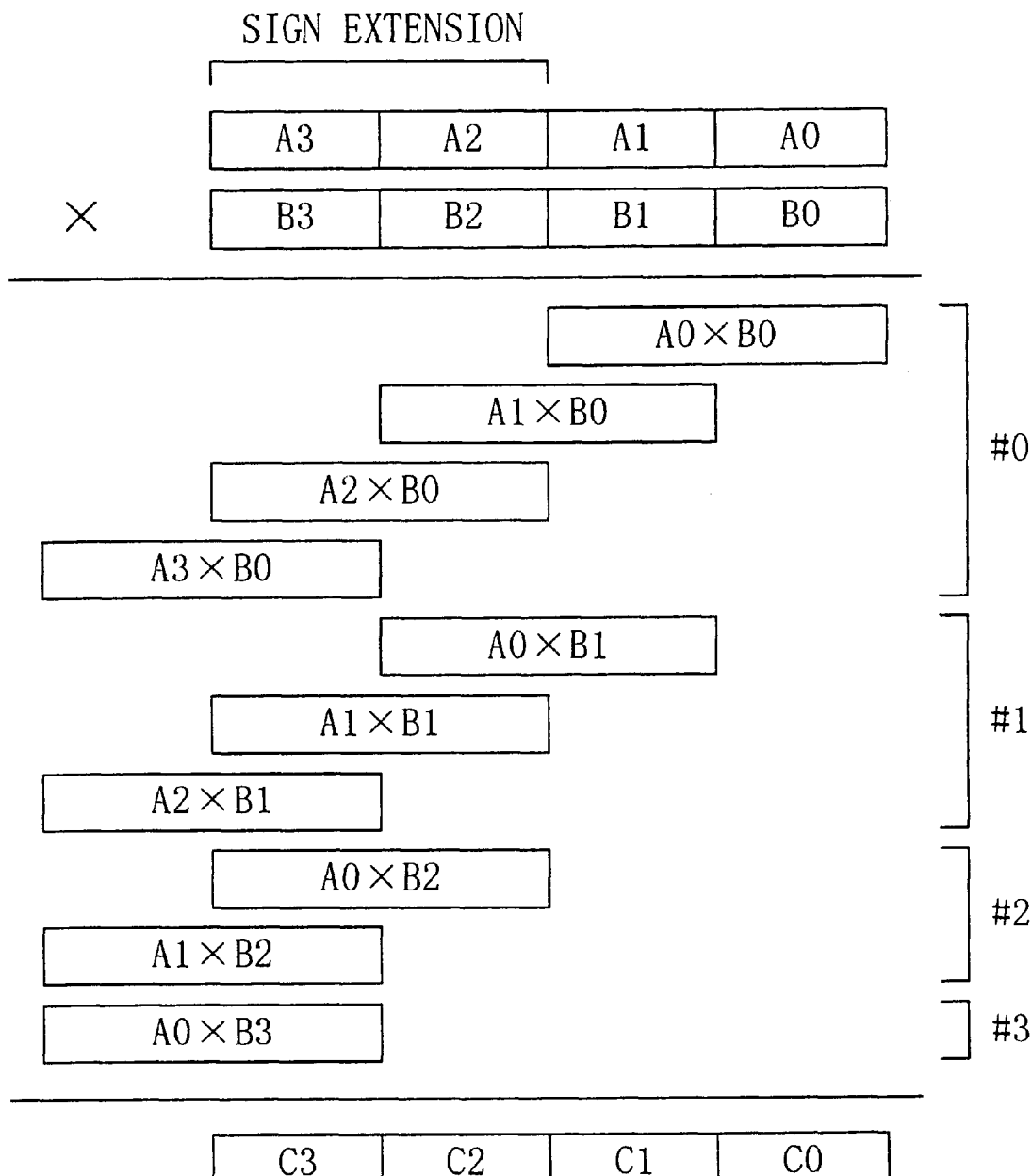
FIG. 3 shows an example of a singed multiplication operation that is performed by the digit-serial multiplier of FIG. 1.

FIG. 3 shows an example of a multiplication operation which is carried out by the digit-serial multiplier 50 of FIG. 1. Within the digit-serial multiplier 50, two sign extension digits A2 and A3 are added at digit positions higher than the multiplicand most significant digit A1. The number of such sign extension digits corresponds to the number of digits forming the multiplier B (=2). If the multiplicand A is non-negative (in other words, if the MSB (sign bit) of the multiplicand most significant digit A1 is a logical 0 bit), then A2=[0 0 0 0] and A3=[0 0 0 0]). If the multiplicand A is negative (in other words, if the MSB of the multiplicand most significant digit A1 is a logical 1 bit), then A2=[1 1 1 1] and A3=[1 1 1 1]). Additionally, within the digit serial multiplier 50, two sign extension digits B2 and B3 are added at digit positions higher than the multiplier most significant digit B1. The number of such sign extension digits corresponds to the number of digits forming the multiplicand A (=2). If the multiplier B is non-negative (in other words, if the MSB (sign bit) of the multiplier most significant digit B1 is a logical 0 bit), then B2=[0 0 0 0] and B3=[0 0 0 0]. If the multiplier B is negative (in other words, if the MSB of the multiplier most significant digit B1 is a logical 1 bit), then B2=[1 1 1 1] and B3=[1 1 1 1]. The digit multiplier #0 computes in sequence partial products A0×B0, A1×B0, A2×B0, and A3×B0. The digit multiplier #1 computes in sequence partial products A0×B1, A1×B1, and A2×B1. The digit multiplier #2 computes in sequence partial products A0×B2 and A1×B2. The digit multiplier #3 computes a partial product A0×B3. The four product result digits C0–C3 are found from these ten partial products.

Figure 4:
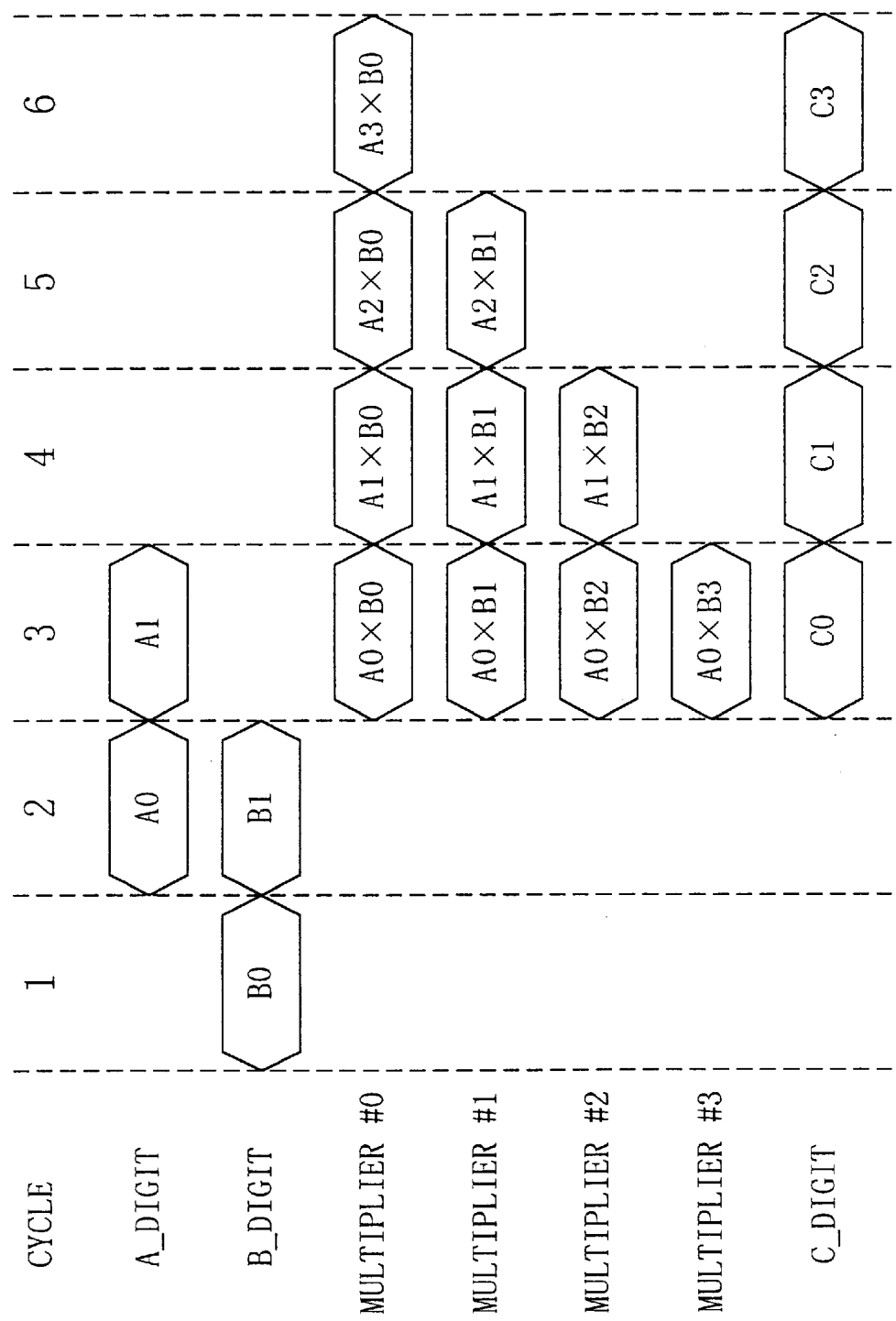
FIG. 4 is a timing diagram showing the operation of the digit serial multiplier of FIG. 1.

FIG. 4 is a timing diagram of the operation of the digit-serial multiplier 50 of FIG. 1. Hereinafter, the operation of the digit-serial multiplier 50 is described cycle by cycle. Prior to the following operations of the digit-serial multiplier 50, the index registers 21 of the digit multipliers #0–#3 are initialized to 0, to 1, to 2, and to 3, respectively. Such initialization causes the digit multipliers #0–#3 to have charge of performing operations on the multiplier digits B0–B3, respectively.

At cycle 1, the digit B0 is supplied onto the multiplier bus. The sequence controller parts 30 of the digit multipliers #0–#3 each learn the start of the multiplication from the fact that the multiplier digit position indicator B_IND provides an LSD indication. Each partial-sum register 24 is initialized to [0 0 0 0], while each intermediate-sum register 25 is initialized to [0 0 0 0 0].

At cycle 2, the multiplier register 23 of the digit multiplier #0 stores the digit B0. Thereafter, the digit B1 is supplied onto the multiplier bus and the digit A0 is supplied onto the multiplicand bus. The sequence controller parts 30 of the digit multipliers #2 and #3 each learn the sign of the multiplier B from the MSB of the digit B1.

At cycle 3, the multiplier register 23 of the digit multiplier #1 stores the digit B1, and the multiplicand registers 22 of the digit multipliers #0–#3 each store the digit A0. Thereafter, the digit A1 is supplied onto the multiplicand bus. The sequence controller parts 30 of the digit multipliers #0 and #1 each learn the sign of the multiplicand A from the MSB of the digit A1. In the digit multiplier #0, the input selector 26 provides the digit A0 stored in the multiplicand register 22 and the digit B0 stored in the multiplier register 23 to the partial multiplier 27. In the digit multiplier #1, the input selector 26 provides the digit A0 stored in the multiplicand register 22 and the digit B1 stored in the multiplier register 23 to the partial multiplier 27. In the digit multiplier #2, the input selector 26 provides the digit A0 stored in the multiplicand register 22 and the sign extension digit ([0 0 0 0] or [1 1 1 1]) B2 according to the sign of the multiplier B to the partial multiplier 27. In the digit multiplier #3, the input selector 26 provides the digit A0 stored in the multiplicand register 22 and the sign extension digit ([0 0 0 0] or [1 1 1 1]) B3 according to the sign of the multiplier B to the partial multiplier 27. As a result, the partial multipliers 27 of the digit multipliers #0–#3 compute respective partial products (i.e. A0×B0, A0×B1, A0×B2, and A0×B3). In the digit multiplier #0, the partial adder 28 performs addition of the four low order bits of the partial product A0×B0 delivered from the partial multiplier 27, the five bits [0 0 0 0 0] delivered from the intermediate-sum register 25, and the four bits [0 0 0 0] delivered from the partial-sum register 24 to form a sum result. Of this sum result, the four low order bits (SUM) are output as the product result digit C0. The carry CY (=[0 0]), which occurred in the addition operation carried out by the partial adder 28 of the digit multiplier #0, is supplied to the carry adder 29, together with the four high order bits of the partial product A0×B0. Accordingly, the four high order bits of the partial product A0×B0 are stored intact in the intermediate-sum register 25. In the digit multiplier #1, the partial adder 28 performs addition of the four low order bits of the partial product A0×B1 delivered from the partial multiplier 27, the five bits [0 0 0 0 0] delivered from the intermediate-sum register 25, and the four bits [0 0 0 0] delivered from the partial-sum register 24 to form a sum result. Of this sum result, the four low order bits are stored in the partial-sum register 24 of the digit multiplier #0. The carry CY (=[0 0]), which occurred in the addition operation of the partial adder 28 of the digit multiplier #1, is supplied to the carry adder 29 of the digit multiplier #1, together with the four high order bits of the partial product A0×B1. Accordingly, the four high order bits of the partial product A0×B1 are stored intact in the intermediate-sum register 25 of the digit multiplier #1. In the digit multiplier #2, the partial adder 28 performs addition of the four low order bits of the partial product A0×B2 delivered from the partial multiplier 27, the five bits [0 0 0 0 0] delivered from the intermediate-sum register 25, and the four bits [0 0 0 0] delivered from the partial-sum register 24 to form a sum result. Of this sum result, the four low order bits are stored in the partial-sum register 24 of the digit multiplier #1. The carry CY (=[0 0]), which occurred in the addition operation by the partial adder 28 of the digit multiplier #2, is supplied to the carry adder 29 of the digit multiplier #2, together with the four high order bits of the partial product A0×B2. Accordingly, the four high order bits of the partial product A0×B2 are stored intact in the intermediate-sum register 25 of the digit multiplier #2. In the digit multiplier #3, the partial adder 28 performs addition of the four low order bits of the partial product A0×B3 delivered from the partial multiplier 27, the five bits [0 0 0 0 0] delivered from the intermediate-sum register 25, and the four bits [0 0 0 0] delivered from the partial-sum register 24 to form a sum result. Of this sum result, the four low order bits are stored in the partial-sum register 24 of the digit multiplier #2. Since the operation of the digit multiplier #3 after this point on exerts no effect on the computation of the product result C, the description thereof is omitted. The sequence controller part 30 of the digit multiplier #0 outputs the product result digit position indicator C_IND which provides an LSD indication.

At cycle 4, the multiplicand registers 22 of the digit multipliers #0–#2 each store the digit A1. In the digit multiplier #0, the input selector 26 provides the digit A1 stored in the multiplicand register 22 and the digit B0 stored in the multiplier register 23 to the partial multiplier 27. In the digit multiplier #1, the input selector 26 provides the digit A1 stored in the multiplicand register 22 and the digit B1 stored in the multiplier register 23 to the partial multiplier 27. In the digit multiplier #2, the input selector 26 provides the digit A1 stored in the multiplicand register 22 and the sign extension digit ([0 0 0 0] or [1 1 1 1]) B2 according to the sign of the multiplier B to the partial multiplier 27. As a result, the partial multipliers 27 of the digit multipliers #0–#2 compute respective partial products (A1×B0, A1×B1, and A1×B2). In the digit multiplier #0, the partial adder 28 performs addition of the four low order bits of the partial product A1×B0 delivered from the partial multiplier 27, the intermediate sum (the four high order bits of the partial product A0×B0) delivered from the intermediate-sum register 25, and the partial sum (the four low order bits of the partial product A0×B1) delivered from the partial-sum register 24 to form a sum result. Of this sum result, the four low order bits (SUM) are output as the product result digit C1. The carry CY, which occurred in the addition operation by the partial adder 28 of the digit multiplier #0, is supplied to the carry adder 29, together with the four high order bits of the partial product A1×B0. Accordingly, the four high order bits (with a carry) of the partial product A1×B0 are stored in the intermediate-sum register 25. In the digit multiplier #1, the partial adder 28 performs addition of the four low order bits of the partial product A1×B1 delivered from the partial multiplier 27, the intermediate sum (the four high order bits of the partial product A0×B1) delivered from the intermediate-sum register 25, and the partial sum (the four low order bits of the partial product A0×B2) delivered from the partial-sum register 24 to form a sum result. Of this sum result, the four low order bits are stored in the partial-sum register 24 of the digit multiplier #0. The carry CY, which occurred in the addition operation by the partial adder 28 of the digit multiplier #1, is supplied to the carry adder 29 of the digit multiplier #1, together with the four high order bits of the partial product A1×B1. Accordingly, the four high order bits (with a carry) of the partial product A1×B1 are stored in the intermediate-sum register 25 of the digit multiplier #1. In the digit multiplier #2, the partial adder 28 performs addition of the four low order bits of the partial product A1×B2 delivered from the partial multiplier 27, the intermediate sum (the four high order bits of the partial product A0×B2) delivered from the intermediate-sum register 25, and the partial sum (the four low order bits of the partial product A0×B3) delivered from the partial-sum register 24 to form a sum result. Of this sum result, the four low order bits are stored in the partial-sum register 24 of the digit multiplier #1. Since the operation of the digit multiplier #2 after this time on exerts no effect on the computation of the product result C, the description thereof is omitted. The sequence controller part 30 of the digit multiplier #0 outputs the product result digit position indicator C_IND providing an ISD indication.

At cycle 5, in the digit multiplier #0 the input selector 26 provides, to the partial multiplier 27, the sign extension digit ([0 0 0 0] or [1 1 1 1]) A2 according to the sign of the multiplicand A and the digit B0 stored in the multiplier register 23. In the digit multiplier #1, the input selector 26 provides, to the partial multiplier 27, the sign extension digit ([0 0 0 0] or [1 1 1 1]) A2 according to the sign of the multiplicand A and the digit B1 stored in the multiplier register 23. As a result, the partial multipliers 27 of the digit multipliers #0 and #1 compute respective partial products (A2×B0 and A2×B1). In the digit multiplier #0, the partial adder 28 performs addition of the four low order bits of the partial product A2×B0 delivered from the partial multiplier 27, the intermediate sum (the four high order bits of the partial product A1×B0) delivered from the intermediate-sum register 25, and the partial sum (the four low order bits of a sum of the four low order bits of the partial product A1×B1, the four high order bits of the partial product A0×B1, and the four low order bits of the partial product A0×B2) delivered from the partial-sum register 24 to form a sum result. Of this sum result, the four low order bits (SUM) are output as the product result digit C2. The carry CY, which occurred in the addition operation by the partial adder 28 of the digit multiplier #0, is supplied to the carry adder 29, together with the four high order bits of the partial product A2×B0. Accordingly, the four high order bits (with a carry) of the partial product A2×B0 are stored in the intermediate-sum register 25. In the digit multiplier #1, the partial adder 28 performs addition of the four low order bits of the partial product A2×B1 delivered from the partial multiplier 27, the intermediate sum (the four low order bits of the partial product A1×B1) delivered from the intermediate-sum register 25, and the partial sum (the four low order bits of a sum of the four low order bits of the partial product A1×B2, the four high order bits of the partial product A0×B2, and the four low order bits of the partial product A0×B3) delivered from the partial-sum register 24 to form a sum result. Of this sum result, the four low order bits are stored in the partial-sum register 24 of the digit multiplier #0. Since the operation of the digit multiplier #1 after this point on exerts no effect on the computation of the product result C, the description thereof is omitted. The sequence controller part 30 of the digit multiplier #0 outputs the product result digit position indicator C_IND providing an ISD indication.

At cycle 6, in the digit multiplier #0 the input selector 26 provides, to the partial multiplier 27, the sign extension digit ([0 0 0 0] or [1 1 1 1]) A3 according to the sign of the multiplicand A and the digit B0 stored in the multiplier register 23. As a result, the partial multiplier 27 of the digit multiplier #0 computes a partial product (A3×B0). In the digit multiplier #0, the partial adder 28 performs addition of the four low order bits of the partial product A3×B0 delivered from the partial multiplier 27, the intermediate sum (the four high order bits of the partial product A2×B0) delivered from the intermediate-sum register 25, and the partial sum (the four low order bits of the partial product A2×B1, the four high order bits of the partial product A1×B1, and the partial sum delivered from the partial-sum register 24 of the digit multiplier #1 at cycle 5) to form a sum result. Here, the partial sum delivered from the partial-sum register 24 of the digit multiplier #1 at cycle 5 is the four low order bits of a sum of the four low order bits of the partial product A1×B2, the four high order bits of the partial product A0×B2, and the four low order bits of the partial product A0×B3. Of the sum result found by the partial adder 28 of the digit multiplier #0 at cycle 6, the four low order bits (SUM) are output as the product result digit C3. The sequence controller part 30 of the digit multiplier #0 outputs the product result digit position indicator C_IND providing an MSD indication.

From the above-described operations, the product result digits C0–C3 are found together with their respective product result digit position indicators C_IND.

As can be seen from FIG. 3, neither of the multiplier sign extension digits B2 and B3 is selected in the digit multipliers #0 and #1 and neither of the multiplicand sign extension digits A2 and A3 is selected in the digit multipliers #2 and #3. Accordingly, each of the sequence controller parts 30 of the digit multipliers is designed such that it limits the alternative of selecting the multiplicand operand or the multiplier operand in the input selector 26 according to the index delivered from the index register 21.

The digit multiplier 50 having the four digit multipliers also has the capability of computing products of 3-digit multiplicands represented in two's complement format and 1-digit multipliers represented in two's complement format, in the case of which one sign extension digit is added to the multiplicands and three expansion digits are added to the multipliers. In addition, the digit multiplier 50 is capable of computing products of 1-digit multiplicands represented in two's complement format and 3-digit multipliers represented in two's complement format, in the case of which three sign extension digits are added to the multiplicands and one expansion digit is added to the multipliers.

If the multiplicand A is always non-negative, then A2=A3=[0 0 0 0] holds. Accordingly, there is no need to compute the partial products (A2×B0, A3×B0, A2×B1) of FIG. 3. In other words, it is possible to stop the partial multipliers 27 of the digit multipliers #0 and #1 from operating during the cycles 5 and 6. If the multiplier B is always non-negative, then B2=B3=[0 0 0 0] holds. Accordingly, there is no need to compute the partial products (A0×B2, A1×B2, A0×B3) of FIG. 3. In other words, the product result C can be computed using the two digit multipliers #0 and #1. Also, computing products of non-negative 16-bit multiplicands and non-negative multipliers can be carried out by the four digit multipliers #0–#3.

The two sign extension digits B2 and B3 relating to the multiplier B always agree. Accordingly, if the partial product A0×B2 (which was found in the digit multiplier #2) is used in place of the partial product A0×B3, this makes it possible to compute the product result C by the use of the three digit multipliers #0–#2.

Figure 5:
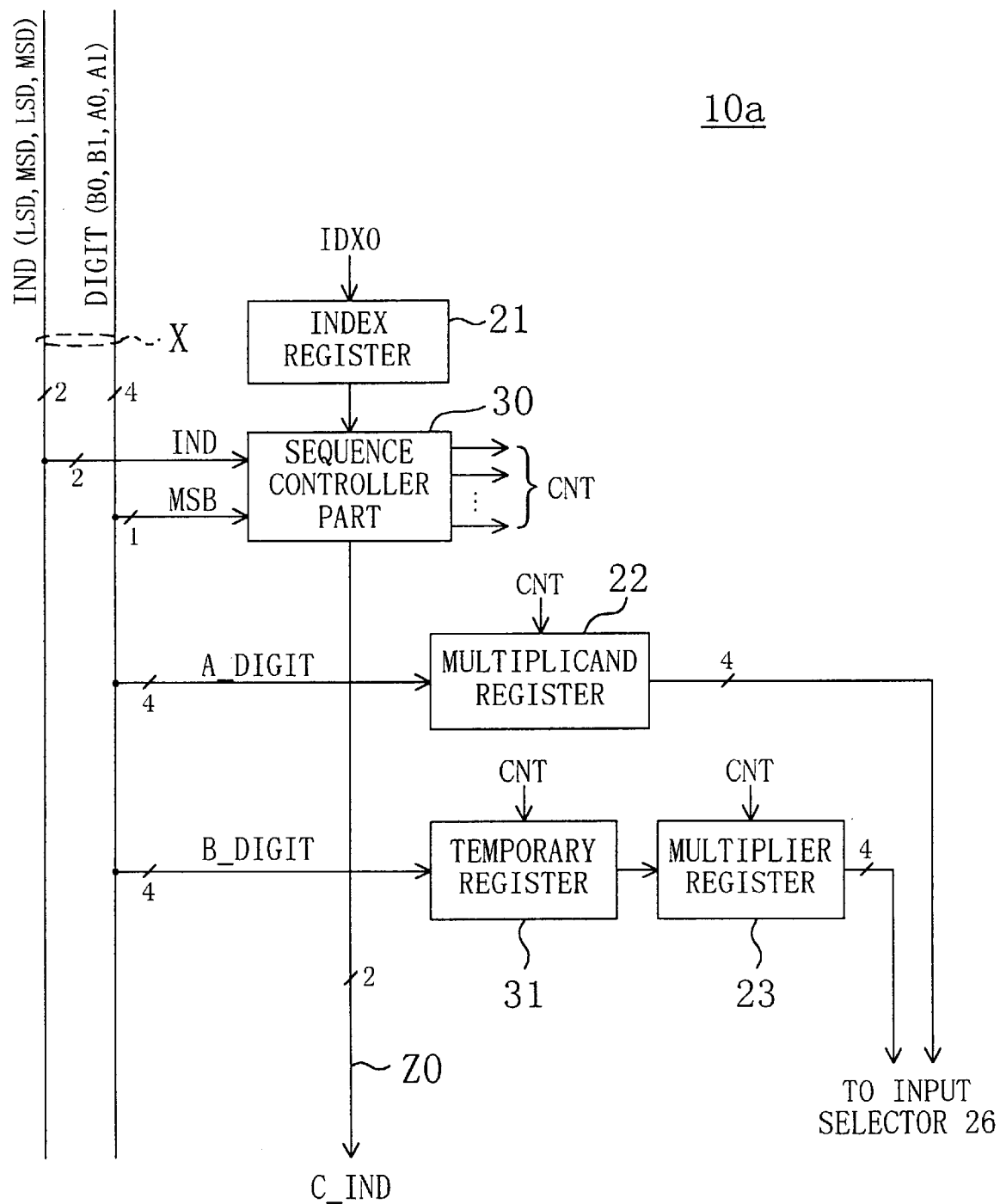
FIG. 5 shows in block diagram form a variation of the structure of FIG. 2.

FIG. 5 shows a variation of the structure of FIG. 2. Referring to FIG. 5, the multiplier least significant digit B0, the multiplier most significant digit B1, the multiplicand least significant digit A0, and the multiplicand most significant digit A1 are supplied, in that order, onto a 4-bit common bus. A digit DIGIT of FIG. 5 represents any one of the digits B0, B1, A0, and A1. A digit position indicator IND provides an indication of whether a digit currently present on the common bus is an LSD or an MSD. In a digit multiplier 10a of FIG. 5, a temporary register 31 is connected between the multiplier register 23 and the common bus. In accordance with such a structure, after a certain multiplier digit is stored in the temporary register 31 the multiplier digit is transferred to the multiplier register 23 from the temporary register 31 at the same time that the multiplicand least significant digit A0 is stored in the multiplicand register 22.

Figure 6:
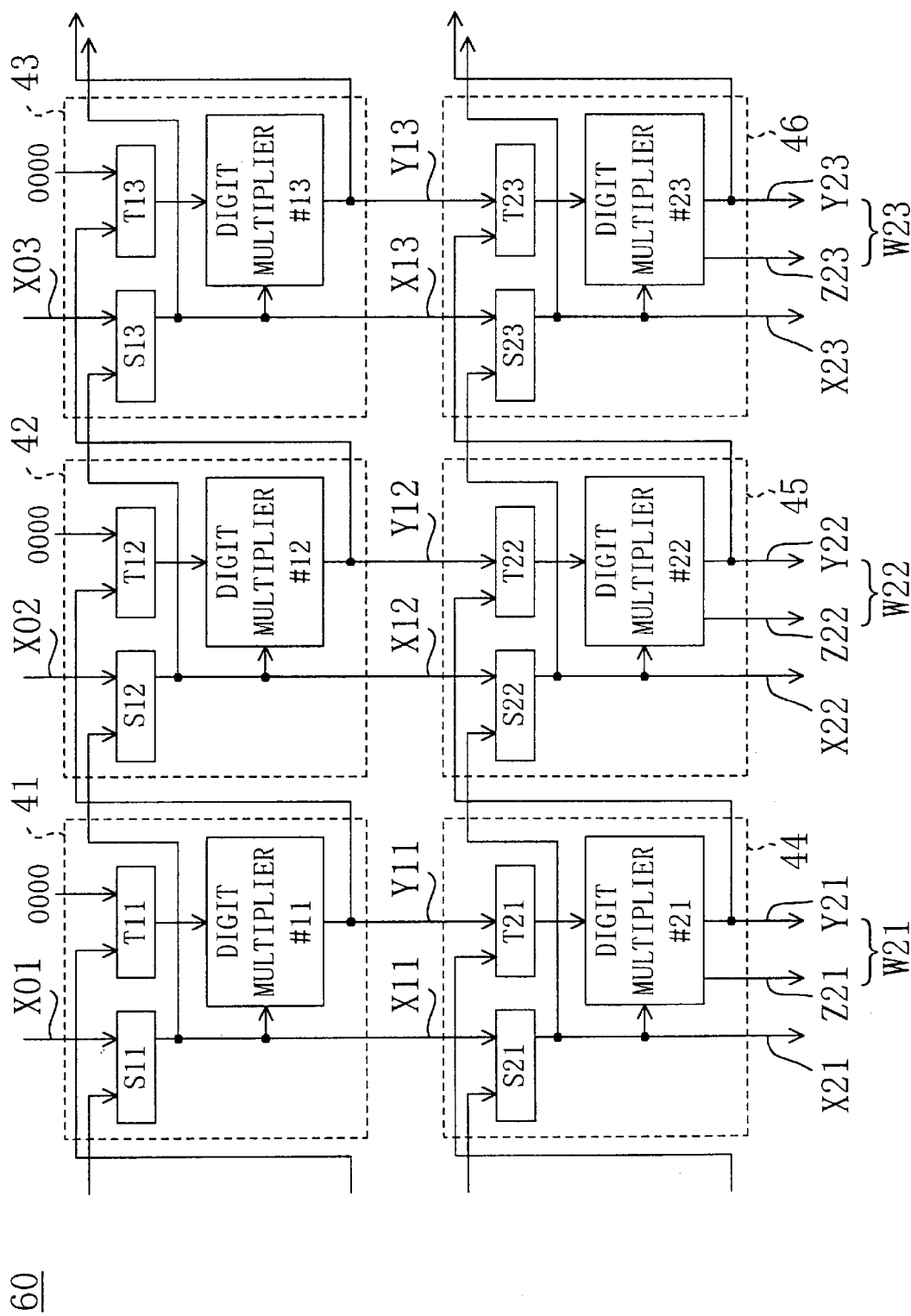
FIG. 6 shows in block diagram form an example of the structure of a reconfigurable digit-serial multiplier in accordance with the present invention.

FIG. 6 shows an example of the structure of a reconfigurable digit-serial multiplier in accordance with the present invention. A digit-serial multiplier 60 of FIG. 6 has six digit multipliers #11–#13 and #21–#23. These six digit multipliers #11–#13 and #21–#23 are arranged in a two-dimensional array. The six digit multipliers #11–#13 and #21–#23 each have an internal structure as shown in FIG. 2 or in FIG. 5. Data X01–X03, X11–X13, and X21–X23 correspond to the data X of FIGS. 1 and 2 or to the data X in FIG. 5. Data Y11–Y13 and Y21–Y23 of FIG. 6 correspond to the data Y0–Y3 of FIG. 1. Data Z21–Z23 of FIG. 6 correspond to the data Z0 of FIG. 1. Referring to FIG. 6, two selectors S11 and T11 are added to the digit multiplier #11, two selectors S12 and T12 are added to the digit multiplier #12, two selectors S13 and T13 are added to the digit multiplier #13, two selectors S21 and T21 are added to the digit multiplier #21, two selectors S22 and T22 are added to the digit multiplier #22, and two selectors S23 and T23 are added to the digit multiplier #23, in order to form six digit multipliers 41–46 with two selectors S and T each. Each of these digit multipliers 41–46 is capable of selecting data from its overlying component or data from its left-hand component. For instance, the digit multiplier 45 can select not only the data X12 and Y12 delivered from its overlying digit multiplier (the digit multiplier 42) but also the data X21 and Y21 delivered from its left-handed digit multiplier (the digit multiplier 44). In the following description, the data Y21 and the data Z21 are collectively called data W21. Data W22 and data W23 are defined in the same way as the data W21. In FIG. 6, the representation of the index signals is omitted.

The digit-serial multiplier 60 of FIG. 6 is operable to perform simultaneous computation of three pairs of products of 8-bit multiplicands and non-negative 8-bit multipliers, in the case of which the six selectors S11, S21, S12, S22, S13, and S23 select data delivered from their respective overlying components in order to cause each of X01=X11=X21, X02=X12=X22, and X03=X13=X23 to hold. Likewise, the six selectors T11, T21, T12, T22, T13, and T23 select data delivered from their respective overlaying components. Additionally, each digit multiplier is given a required index signal prior to the start of the arithmetic computation so that the three digit multipliers #21–#23 each have charge of processing of the multiplier least significant digit and the three digit multipliers #11–#13 each have charge of processing of the multiplier most significant digit.

In addition to the above, the digit-serial multiplier 60 of FIG. 6 is operable to perform simultaneous computation of two pairs of products of 8-bit multiplicands and non-negative 12-bit multipliers, in the case of which the four selectors S11, S21, S12, and S23 each select data delivered from their respective overlying components and the two selectors S22 and S13 select data delivered from their respective left-hand components in order to cause each of X01=X11=X21=X22 and X02=X12=X13=X23 to hold. Like the selectors S11, S21, S12, and S23, the four selectors T11, T21, T12, and T23 select data delivered from their respective overlying components. Like the selectors S22 and S13, the two selectors T22 and T13 select data delivered from their respective left-hand components. Additionally, each digit multiplier is given a required index signal prior to the start of the arithmetic computation so that the two digit multipliers #22 and #23 each have charge of processing of the multiplier least significant digit, the two digit multipliers #21 and #13 each have charge of processing of the multiplier intermediate significant digit, and the two digit multipliers #11 and #12 each have charge of processing of the multiplier most significant digit.

Figure 7:
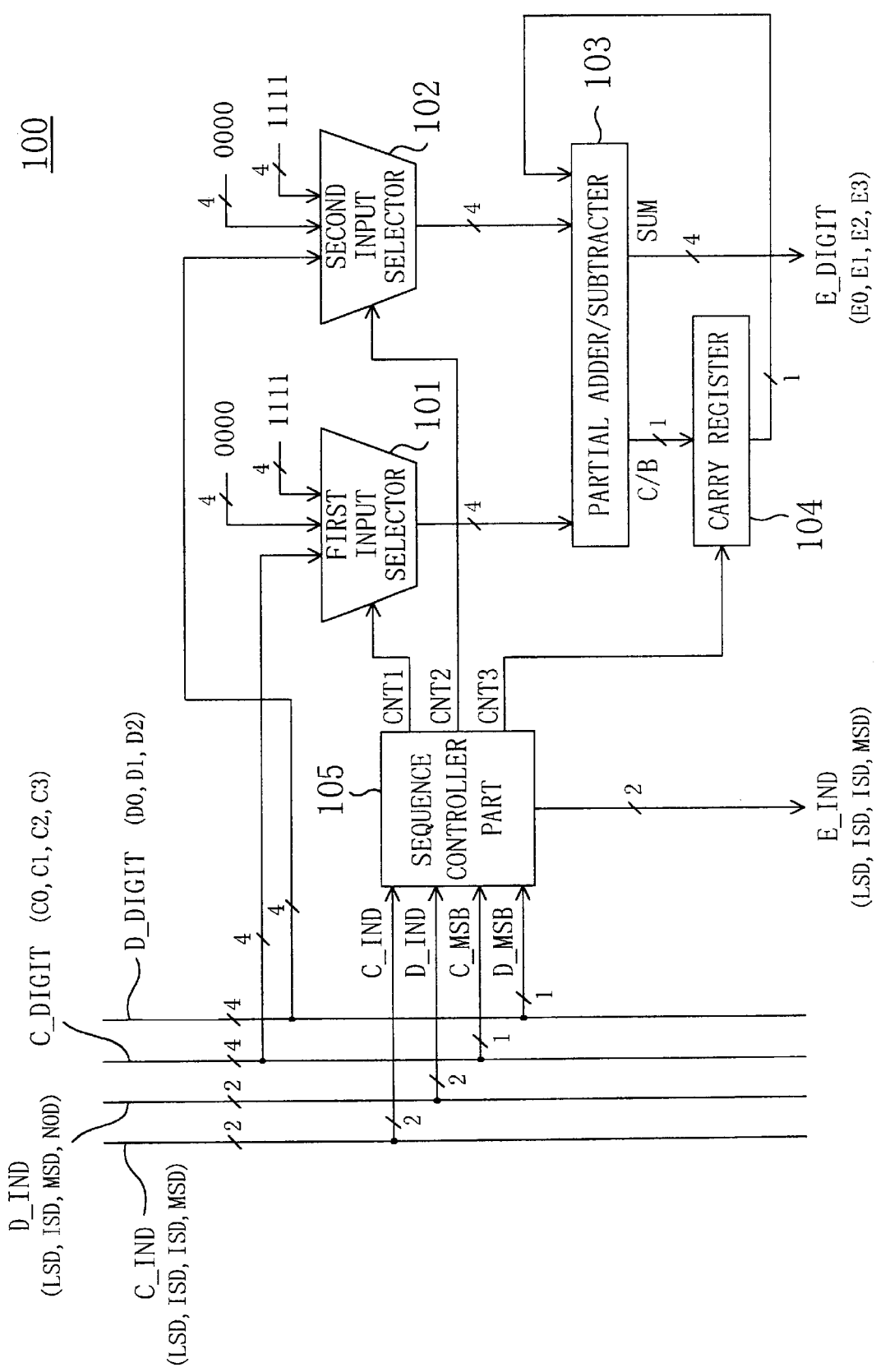
FIG. 7 shows in block diagram form an example of the structure of a digit-serial adder/subtracter in accordance with e present invention.

FIG. 7 shows an example of the structure of a digit-serial adder/subtracter in accordance with the present invention.

The digit-serial adder/subtracter of FIG. 7 is able to perform an addition operation shown in the expression (3), that is, E=C+D where the number C represents a 4-digit augend, the number D represents a 3-digit addend, and the number E represents a 4-digit sum result. The augend C, the addend D, and the sum result E are all fixed-point numbers represented in two's complement format.

The augend C is made up of four different digits, namely a 4-bit least significant digit (LSD) C0, a first 4-bit intermediate significant digit (ISD) C1, a second 4-bit intermediate significant digit (ISD) C2, and a 4-bit most significant digit (MSD) C3. An augend digit C_DIGIT of FIG. 7 represents any one of the augend digits C0–C3 which are sequentially input to the digit-serial adder/subtracter through a 4-bit augend bus. An augend digit position indicator C_IND (which is input to the digit-serial adder/subtracter) provides an indication of whether an augend digit currently present on the augend bus is an LSD, an ISD, or an MSD. When no augend digit is supplied onto the augend bus, the augend digit position indicator C_IND provides an NOD (No Data) indication.

The addend D is made up of three different digits, namely a 4-bit least significant digit (LSD) D0, a 4-bit intermediate significant digit (ISD) D1, and a 4-bit most significant digit (MSD) D2. An addend digit D_DIGIT of FIG. 7 represents any one of the addend digits D0–D2 which are sequentially input to the digit-serial adder/subtracter through a 4-bit addend bus. An addend digit position indicator D_IND (which is input to the digit-serial adder/subtracter) provides an indication of whether an addend digit currently present on the addend bus is an LSD, an ISD, or an MSD. When no addend digit is supplied onto the addend bus, the addend digit position indicator D_IND provides an NOD (No Data) indication.

The sum result E is made up of four different digits, namely a 4-bit least significant digit (LSD) E0, a first 4-bit intermediate significant digit (ISD) E1, a second 4-bit intermediate significant digit (ISD) E2, and a 4-bit most significant digit (MSD) E3. A sum result digit E_DIGIT of FIG. 7 represents any one of the sum result digits E0–E3 which are sequentially output from the digit-serial adder/subtracter through a 4-bit sum result bus. A sum result digit position indicator E_IND (which is output from the digit-serial adder/subtracter) provides an indication of whether a sum result digit currently present on the sum result bus is an LSD, an ISD, or an MSD. When no sum result digit is supplied onto the sum result bus, the sum result digit position indicator E_IND provides an NOD (No Data) indication.

A digit-serial adder/subtracter 100 of FIG. 7 has a first input selector 101, a second input selector 102, a partial adder/subtracter 103, a carry register 104 for storing a 1-bit carry, and a sequence controller part 105. The first input selector 101 provides as an augend operand any one of the augend digit C_DIGIT on the augend bus, a 4-bit binary representation constant [0 0 0 0], and a 4-bit binary representation constant [1 1 1 1] to the partial adder/subtracter 103. The second input selector 102 provides as an addend operand any one of the addend digit D_DIGIT on the addend bus, a 4-bit binary representation constant [0 0 0 0], and a 4-bit binary representation constant [1 1 1 1] to the partial adder/subtracter 103. The partial adder/subtracter 103 performs addition of the augend operand delivered from the first input selector 101, the addend operand delivered from the second input selector 102, and the 1-bit carry stored in the carry register 104 to form a sum result which is at most five bits in length. Of this sum result, the four low order bits form a digit that is output as the sum result digit E_DIGIT and the high order bit (i.e. a carry C/B) is stored in the carry register 104. The sequence controller part 105 makes reference to the most significant bit (C_MSB) of the augend digit C_DIGIT if the augend digit position indicator C_IND provides an MSD indication. If the addend digit position indicator D_IND provides an MSD indication, the sequence controller part 105 makes references to the most significant bit (D_MSB) of the addend digit D_DIGIT. In addition, the sequence controller part 105 provides control signals CNT1–CNT3 to the first input selector 101, to the second input selector 102, and to the carry register 104, respectively. The control signal CNT1 controls augend selection in the first input selector 101. The control signal CNT2 controls addend selection in the second input selector 102. The control signal CNT3 controls the latch timing of the carry register 104. In addition, the sequence controller part 105 has the capability of generating the sum result digit position indicator E_IND. In the case of the subtraction, the borrow C/B is output from the partial adder/subtracter 103.

Figure 8:
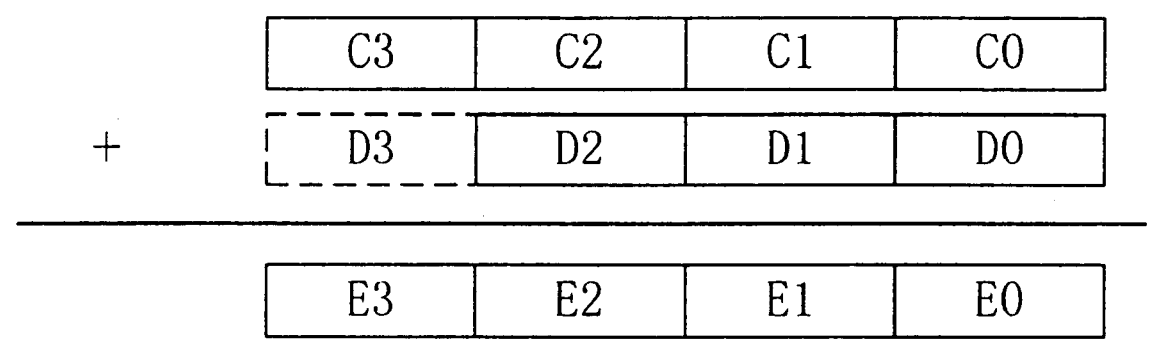

FIG. 8 shows an example of a signed addition operation which is carried out by the digit-serial adder/subtracter 100. The carry register 104 is initialized beforehand to 0. At cycle 1, the digit C0 and the digit D0 are supplied at the same time. The first input selector 101 selects the digit C0 and the second input selector 102 selects the digit D0. The adder/subtracter 103 performs addition of the digit C0 and the digit D0 to form a sum result C0+D0. Of this sum result, the four low order bits (SUM) are output as the sum result digit E0. The carry C/B, which occurred in the sum result, is stored in the carry register 104, at which moment since the digit position indicators C_IND and D_IND each provide an LSD indication, the sum result digit position indicator E_IND is set so as to provide an LSD indication.

At cycle 2, the digit C1 and the digit D1 are supplied at the same time. The first input selector 101 selects the digit C1 and the second input selector 102 selects the digit D1. The partial adder/subtracter 103 performs addition of the digit C1, the digit D1, and the carry C/B stored in the carry register 104 to form a sum result. Of this sum result, the four low order bits are output as the sum result digit E1. The carry C/B, which occurred in the sum result, is stored in the carry register 104, at which moment since the digit position indicators C_IND and D_IND each provide an ISD indication, the sum result digit position indicator E_IND is set so as to provide an ISD indication.

At cycle 3, the digit C2 and the digit D2 are supplied at the same time. The sequence controller part 105 learns the sign of the addend D from the MSB of the digit D2. The first input selector 101 selects the digit C2 and the second input selector 102 selects the digit D2. The partial adder/subtracter 103 performs addition of the digit C2, the digit D2, and the carry C/B stored in the carry register 104 to form a sum result. Of this sum result, the four low order bits are output as the sum result digit E2. The carry C/B, which occurred in the sum result, is stored in the carry register 104, at which moment since the digit position indicator C_IND provides an ISD indication and the digit position indicator D_IND provides an MSD indication, the sum result digit position indicator E_IND is set so as to provide an ISD indication.

At cycle 4, the digit C3 is supplied. The sequence controller part 105 causes the second input selector 102 to select the sign extension digit ([0 0 0 0] or [1 1 1 1]) D3 according to the sign of the addend D. The first input selector 101 selects the digit C3. The partial adder/subtracter 103 performs addition of the digit C3, the digit D3, and the carry C/B stored in the carry register 104 to form a sum result. Of this sum result, the four low order bits are output as the sum result digit E3, at which moment since the digit position indicator C_IND provides an MSD indication and the digit position indicator D_IND provides an NOD (No Data) indication, the sum result digit position indicator E_IND is set so as to provide an MSD indication.

By virtue of the above-described operations, the sum result digits E0–E3 are found together with their respective sum result digit position indicators E_IND.

Figure 9:
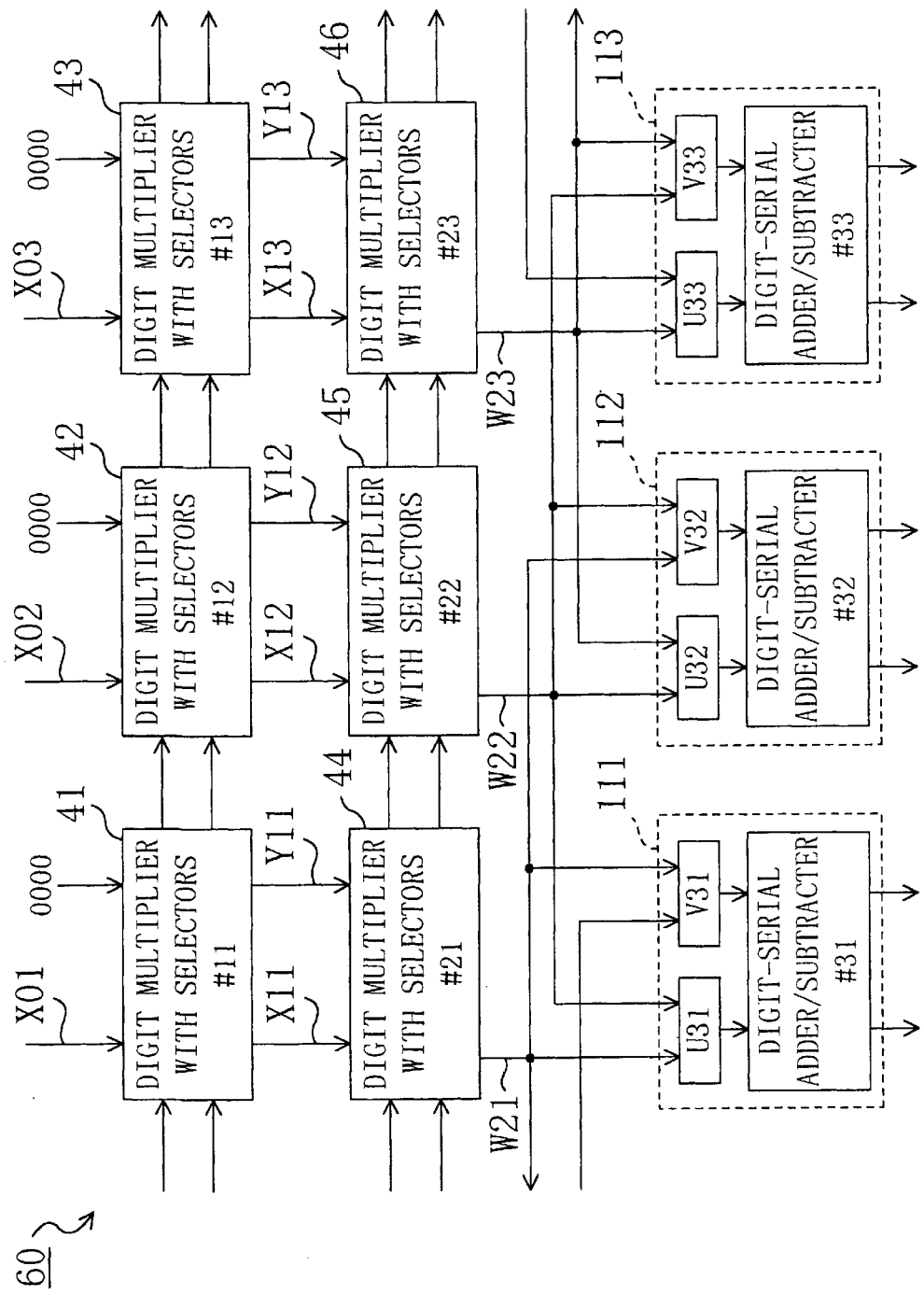
FIG. 9 shows in block diagram form an example of the structure of a reconfigurable digit-serial arithmetic system in accordance with the present invention.

FIG. 9 shows an example of the structure of a reconfigurable digit-serial arithmetic system in accordance with the present invention. The digit-serial arithmetic system of FIG. 9 is formed by adding three digit-serial adder/subtracters #31–#33 to the digit-serial multiplier 60 of FIG. 6. These three digit-serial adder/subtracters #31–#33 #33 each have an internal structure as shown in FIG. 8. Referring to FIG. 9, two selectors U and V are added to each of the three digit-serial adder/subtracters #31–#33 in order to form three digit-serial adder/subtracters 111–113 with two selectors each. Each adder/subtracter-with-selectors is capable of selecting (a) data from its overlying digit multiplier-with-selectors or from its upper right-hand digit multiplier-with-selectors and (b) data from its overlying digit multiplier-with-selectors or from its upper left-hand digit multiplier-with-selectors. For instance, the digit-serial adder/subtracter 112 selects as augend data either the data W22 from its overlying digit multiplier (i.e. the digit multiplier 45) or the data W23 from its upper right-hand digit multiplier (i.e. the digit multiplier 46) and selects as addend data either the data W22 from its overlying digit multiplier 45 or the data W21 from its upper left-hand digit multiplier (i.e. the digit multiplier 44).

In accordance with the digit-serial arithmetic system of FIG. 9, the digit multipliers-with-selectors #11 and #21 can be related with the digit-serial adder/subtracter #31, the digit multipliers-with-selectors #12 and #22 can be related with the digit-serial adder/subtracter #32, and the digit multipliers-with-selectors #13 and #23 can be related with the digit-serial adder/subtracter #33, in the case of which if A01–A03 and B01–B03 are all fixed-point numbers, it is possible to perform simultaneous computation of the following three sums of products PS1–PS3.

$PS1 = A01 \times B01 + A02 \times B02$ $PS2 = A02 \times B02 - A03 \times B03$ $PS3 = A03 \times B03 + A02 \times B02$ Here, the numbers B01–B03 are all non-negative 8-bit multipliers. Also, it is possible to relate the three digit multipliers-with-selectors #11, #21 and #22 with the digit-serial adder/subtracter #32 and to relate the three digit multipliers-with-selectors #12, #13 and #23 with the digit-serial adder/subtracter #33, in the case of which if A04, A05, B04, and B05 are all fixed-point numbers, it is possible to perform simultaneous computation of the following two sums of products PS4 and PS5.

$PS4 = A04 \times B04 + A05 \times B05$ $PS5 = A04 \times B04 \times A05 \times B05$ Here, the numbers B04 and B05 are non-negative 12-bit multipliers.

Figure 10:
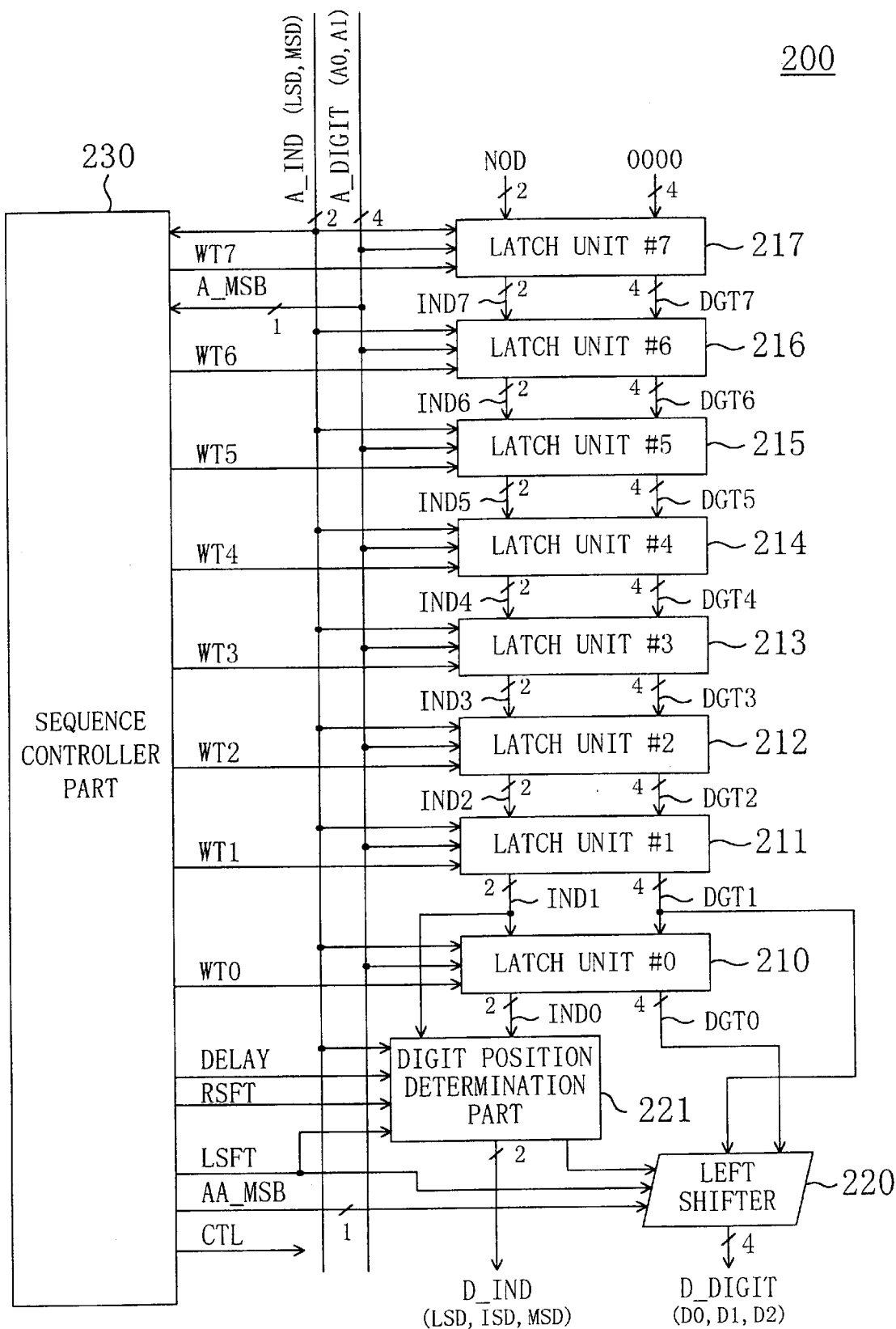
FIG. 10 shows in block diagram form an example of the structure of a digit-serial shifter in accordance with the preset invention.

FIG. 10 shows an example of the structure of a digit-serial shifter in accordance with the present invention. The digit-serial shifter of FIG. 10 is able to perform an arithmetical left shift operation shown in the expression (2). Here, A represents an operand in the shift operation and D represents a result of the shift operation. Both the operand A and the shift operation result D are fixed-point numbers represented in two's complement format. The example of FIG. 10 is able to perform an arithmetical right shift operation shown in the expression (8), which will be described later.

The operand A is made up of a 4-bit least significant digit (LSD) A0 and a 4-bit most significant digit (MSD) A1. A digit A_DIGIT of FIG. 10 represents either one of the operand digits A0 and A1 which are sequentially input to the digit-serial shifter through a 4-bit operand bus. An operand digit position indicator A_IND (which is input to the digit-serial shifter) provides an indication of whether an operand digit currently present on the operand bus is an LSD or an MSD.

The shift operation result D is made up of a 4-bit least significant digit (LSD), a 4-bit intermediate significant digit (ISD) DI, and a 4-bit most significant digit (MSD) D2. A digit D_DIGIT of FIG. 10 represents any one of the shift operation result digits D0–D2 which are sequentially output from the digit-serial shifter through a 4-bit shift operation result bus. A shift operation result digit position indicator D_IND provides an indication of whether a shift operation result digit currently present on the result bus is an LSD, an ISD or an MSD. If no shift operation result digit is supplied onto the shift operation result bus, the shift operation result digit position indicator D_IND provides an NOD (No Data) indication. In the structure of FIG. 10, a 2-bit bus used to output the result digit position indicator D_IND is provided and in addition, another 2-bit bus used to input the operand digit position indicator A_IND is provided. Such provision is made in consideration of cases in which the operand A is made up of three or more digits.

A digit-serial shifter 200 of FIG. 10 has eight latch units (#0–#7) 210–217 (each of which stores a digit and an indicator providing an indication of where the digit is positioned), a left shifter 220 for providing the result digit D_DIGIT, a digit position determination part 221 for providing the result digit position indicator D_IND, and a sequence controller part 230 for controlling the operation of each part. It is possible to write the operand digit A_DIGIT and the operand digit position indicator A_IND to any one of the eight latch units #0–#7 according to control signals WT0–WT7 delivered from the sequence controller part 230. The latch unit #0 receives a digit DGT1 and a digit position indicator IND1 from the latch unit #1 and provides a digit DGT0 and a digit position indicator IND0. The latch unit #2 provides a digit DGT2 and a digit position indicator IND2 to the latch unit #1. The latch unit #3 provides a digit DGT3 and a digit position indicator IND3 to the latch unit #2. The latch unit #4 provides a digit DGT4 and a digit position indicator IND4 to the latch unit #3. The latch unit #5 provides a digit DGT5 and a digit position indicator IND5 to the latch unit #4. The latch unit #6 provides a digit DGT6 and a digit position indicator IND6 to the latch unit #5. The latch unit #7 receives a digit of a 4-bit binary representation constant [0 0 0 0] and a digit position indicator which provides an NOD (No Data) indication and provides a digit DGT7 and a digit position indicator IND7 to the latch unit #6. As described above, the eight latch units #0–#7 are connected together so as to form a shift register having an arbitrary number of stages. Accordingly, these eight latch units #0–#7 can be used simply as delay elements. Basically, the left shifter 220 performs a 1-bit left shift operation, a 2-bit left shift operation, or a 3-bit left shift operation on the digit DGT1 delivered from the latch unit #1 and determines the result digit D_DIGIT by the use of a result of the left shift operation and the digit DGT0 delivered from the latch unit #0. Basically, the digit position determination part 221 determines the result digit position indicator D_IND according to (a) the operand digit position indicator A_IND, (b) the digit position indicator IND1 delivered from the latch unit #1, and (c) the digit position indicator IND0 delivered from the latch unit #0. The digit position determination part 221 also has the function of controlling the operation of the left shifter 220.

Figure 11:
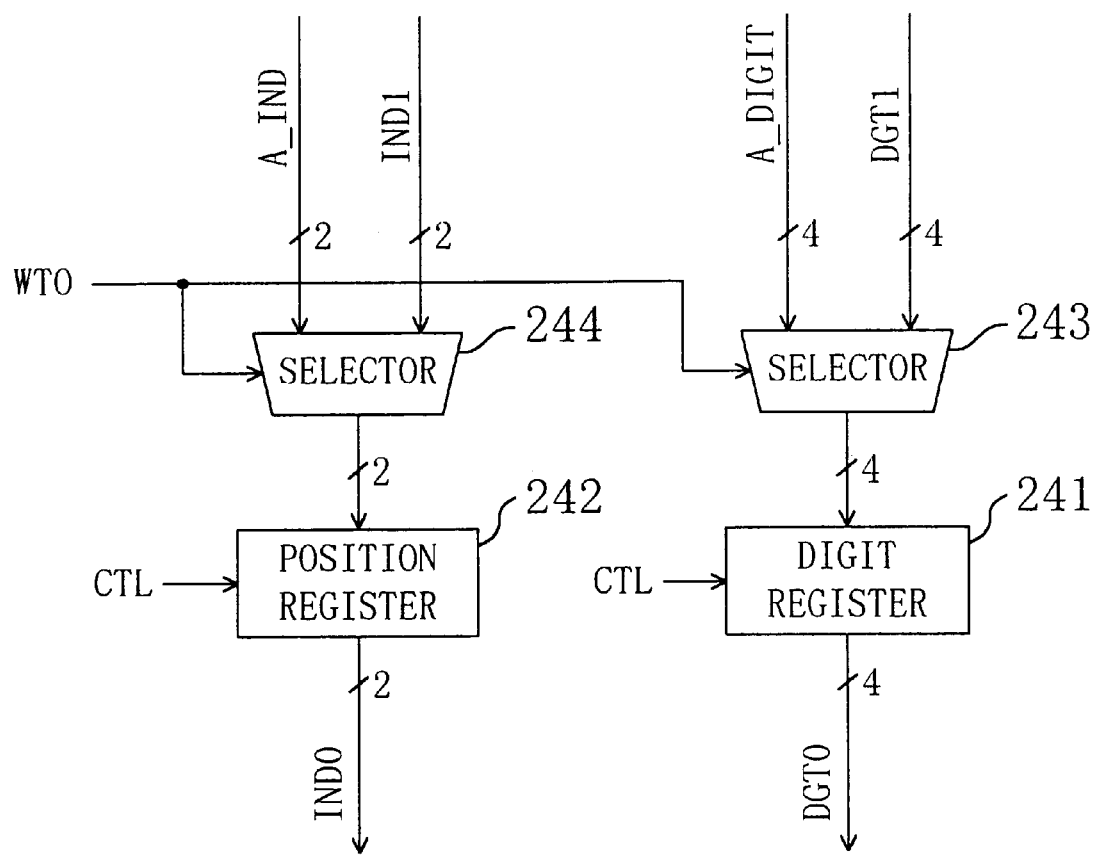
FIG. 11 shows in block diagram form the internal structure of one of eight latch units of FIG. 10.

FIG. 11 shows the internal structure of the latch unit (#0) 210 of FIG. 10. The latch unit 210 of FIG. 11 has a digit register 241 for storing a digit, a position register 242 for storing a position indicator for the stored digit, a first selector 243, and a second selector 244. The first selector 243 selects, according to the control signal WT0, between the operand digit A_DIGIT input through the operand bus and the digit DGT1 delivered from the latch unit #1 and provides the selected digit to the digit register 241. The second selector 244 selects, according to the control signal WT0, between the operand digit position indicator A_IND and the digit position indicator IND1 delivered from the latch unit #1 and provides the selected digit position indicator to the position register 242. The latch timing of the digit register 241 and that of the position register 242 are controlled by a control signal CTL delivered from the sequence controller part 230. The remaining other seven latch units #1–#7 of FIG. 10 are identical in internal structure with the latch unit #0.

Figure 12:
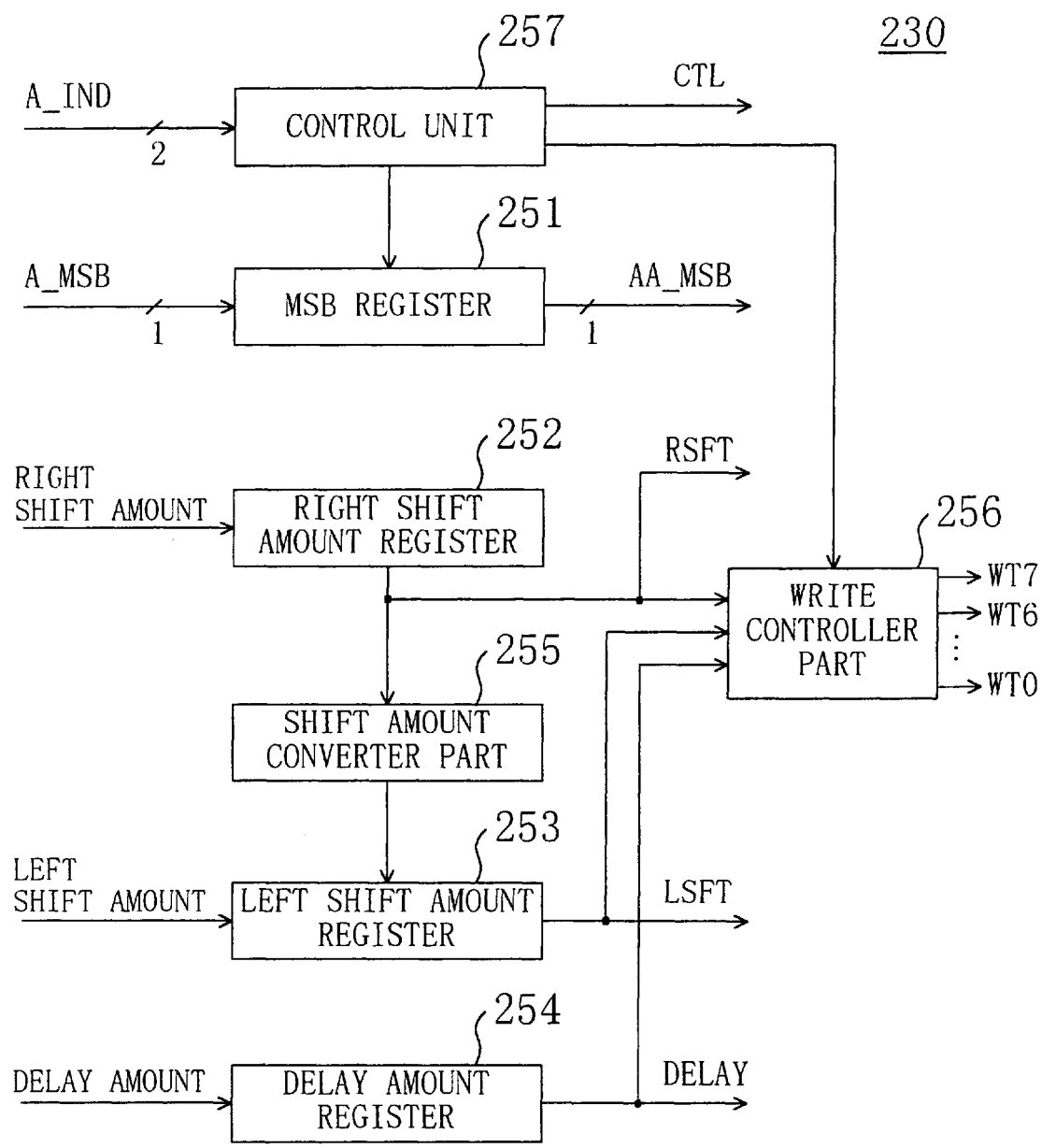
FIG. 12 shows in block diagram form the internal structure of a sequence controller part of FIG. 10.

FIG. 12 shows the internal structure of the sequence controller part 230. The sequence controller part 230 has four registers, namely an MSB register 251 for storing the most significant bit (A_MSB) of the operand digit A_DIGIT when the operand digit position indicator A_IND provides an MSD indication, a right shift amount register 252 for storing a designated right shift amount (RSFT), a left shift amount register 253 for storing a designated left shift amount (LSFT), and a delay amount register 254 for storing a designated delay amount (DELAY). The sequence controller part 230 further has a shift amount converter part 255, a write controller part 256, and a control unit 257. The digit-serial shifter 200 is not provided with a right shifter and is constructed such that even when a right shift operation is designated, the digit-serial shifter 200 performs a left shift operation instead of the designated right shift operation. For instance, an operation, in which an operand is shifted three bit places to the right, is achieved by repeatedly performing a 1-bit left shift operation in digits. The shift amount converter part 255 is disposed to perform conversion of the right shift amount RSFT delivered from the right shift amount register 252 into the left shift amount LSFT. The left shift amount LSFT resulting from such a conversion operation is stored in the left shift amount register 253. Making reference to the left shift amount LSFT delivered from the left shift amount register 253 and to the delay amount DELAY delivered from the delay amount register 254, the write controller part 256 selects a particular one of the eight latch units #0–#7 to which the operand digit A_DIGIT and the operand digit position indicator A_IND are to be written and provides the control signals WT0–WT7 for specifying the selected latch unit. In the case a right shift operation is designated, the write controller part 256 further refers to the right shift amount RSFT. The control unit 257 is disposed to continuously monitor the operand digit position indicator A_IND, provides the control signal CTL for controlling the latch timing of the digit register 241 and the position register 242, controls the latch timing of the MSB register 251, and controls the operation of the write controller part 256. The most significant bit (A_MSB) stored in the MSB register 251 is sent to the left shifter 220 as a sign bit AA_MSB of the operand (see FIG. 10). The left shift amount LSFT is sent to the left shifter 220 and to the digit position determination part 221. The delay amount DELAY and the right shift amount RSFT are sent to the digit position determination part 221.

Figure 13A:
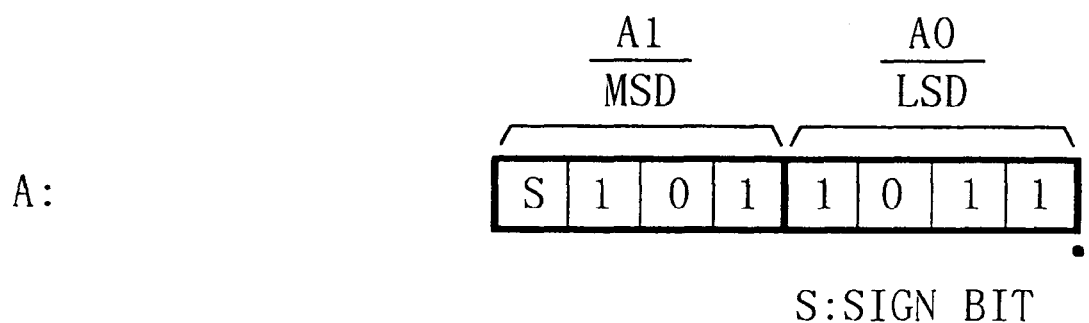
FIG. 13A shows input data and FIG. 13B shows a result of the 3-bit left shift operation.
Figure 13B:
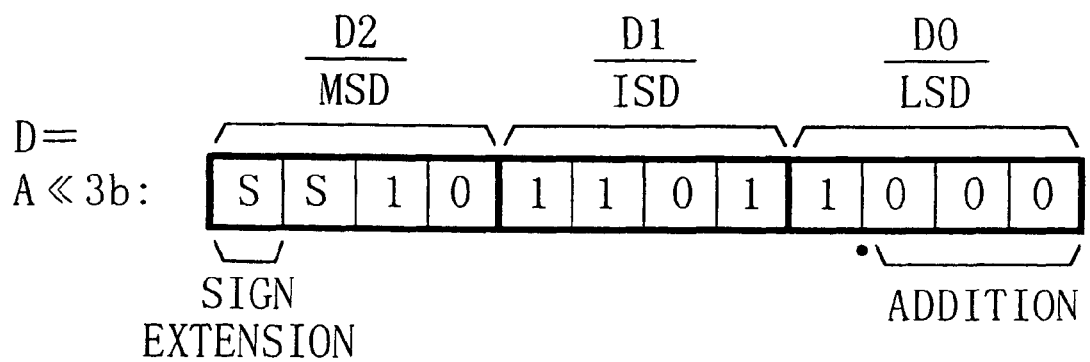

FIG. 13A shows input data of a 3-bit left shift operation (see the expression (2)) for digit position alignment of a fixed-point number A in the digit-serial shifter 200 of FIG. 10. FIG. 13B shows a result (D) of the 3-bit left shift operation. The operand A is a fixed-point number with an 8-bit integer part and has a least significant digit (LSD) A0 and a most significant digit (MSD) A1. The most significant bit of the operand A is a sign bit S. The shift result D is a fixed-point number with a 9-bit integer part and a 3-bit fraction part and has a least significant digit (LSD) D0, an intermediate significant digit (ISD) D1, and a most significant digit (MSD) D2. The fraction part of the shift result D is made up of three bits of logical 0. The most significant bit of the shift result D is a copy of the operand sign bit S. Accordingly, during the 3-bit left shift operation, it is required to perform an operation of adding three logical-0 bits and a 1-bit sign extension operation.

Here, the 3-bit left shift operation of the digit-serial shifter 200 of FIG. 10 is described cycle by cycle. In this case, LSFT (left shift amount)=3 and DELAY (delay amount)=0, and the control signal WT1 is determined such that an operand digit A_DIGIT and an operand digit position indicator A_IND are written to the latch unit #1. In other words, WT1=1 and WTn=0, where the number n=0, 2, 3, 4, 5, 6, 7.

At cycle 1, the digit A0 is supplied, at which moment the digit position indicator A_IND provides an LSD indication.

At cycle 2, the latch unit #1 stores the digit A0 and the digit position indicator A_IND (=LSD). Based on the digit DGT1 (=A0) delivered from the latch unit #1, the left shifter 220 determines the digit D0, at which moment the most significant bit of the digit D0 is determined so as to correspond to the least significant bit of the digit DGT1 (=A0) and each of the three low order bits of the digit D0 is assigned a value of logical 0. The digit position determination part 221 provides a digit position indicator D_IND indicating that the digit D0 is an LSD. Thereafter, the digit A1 is provided, at which moment the digit position indicator A_IND provides an MSD indication. The sequence controller part 230 learns the sign S of the operand from the MSB of the digit A1. Accordingly, the MSB register 251 provides the bit AA_MSB representative of that sign to the left shifter 220.

At cycle 3, after data transmission from the latch unit #1 to the latch unit #0, the latch unit #1 stores the digit A1 and the digit position indicator A_IND (=MSD). Based on the digit DGT, (=A1) delivered from the latch unit #1 and on the digit DGT0 (=A0) delivered from the latch unit #0, the left shifter 220 determines the digit D1, at which moment the most significant bit of the digit D1 is determined so as to correspond to the least significant bit of the digit DGT1 (=A1) and the three low order bits of the digit D1 are determined so as to correspond to the three high order bits of the digit DGT0 (=A0). The digit position determination part 221 provides the digit position indicator D_IND indicating that the digit D1 is an ISD.

At cycle 4, data transmission from the latch unit #1 to the latch unit #0 is carried out. Based on the sign bit AA_MSB delivered from the MSB register 251 and on the digit DGT0 (=A1) delivered from the latch unit #0, the left shifter 220 determines the digit D2, at which moment the most significant bit of the digit D2 is determined so as to correspond to the sign bit AA_MSB and the three low order bits of the digit D0 are determined so as to correspond to the three high order bits of the digit DGT0 (=A1). The digit position determination part 221 provides the digit position indicator D_IND indicating that the digit D2 is an MSD.

By virtue of the above-described operations, the result digits D0–D2 are found together with their respective result digit position indicators D_IND. In a setting which gives a condition of DELAY (delay amount)=0, WT1=1 if 1≦LSFT≦4 and WT2=1 if 5≦LSFT≦8. For instance, in the case the delay amount DELAY is set at 1 (DELAY=1), WT2=1 if 1≦LSFT≦4 and WT3=1 if 5≦LSFT≦8.

As described above, the digit-serial shifter 200 achieves arithmetic right shift operations with the aid of the left shifter 220. FIG. 14A shows input data of a 7-bit right shift operation (see the expression (8)) for rounding of a fixed-point number J carried out by the digit-serial shifter 200 of FIG. 10. FIG. 14B shows a shift result (K) of the 7-bit right shift operation of the FIG. 14A. The operand J is a fixed-point number with a 14-bit integer part and a 10-bit fraction part and has a least significant digit (LSD) J0, four intermediate significant digits (ISDs) J1–J4, and a most significant digit (MSD) J5. The most significant bit of the operand J is a sign bit S. The shift result K is a fixed-point number with a 17-bit integer part and a 3-bit fraction part and has a least significant digit (LSD) K0, three intermediate significant digits (ISDs) K1–K3, and a most significant digit (MSD) K4. Each of the three high order bits of the shift result K is a copy of the sign S. The seven low order bits of the operand J are cut off.

The details of the above-described 7-bit right shift operation in the digit-serial shifter 200 of FIG. 10 (in which the shift amount converter part 255 performs conversion of RSFT=7 into LSFT=1) are not described here. In a setting which gives a condition of DELAY (delay amount)=0, WT2=1. Two cycles, during which the result digit position indicator provides an NOD (No Data) indication, are inserted in order to cut off the seven low order bits of the operand J.

Figure 15:
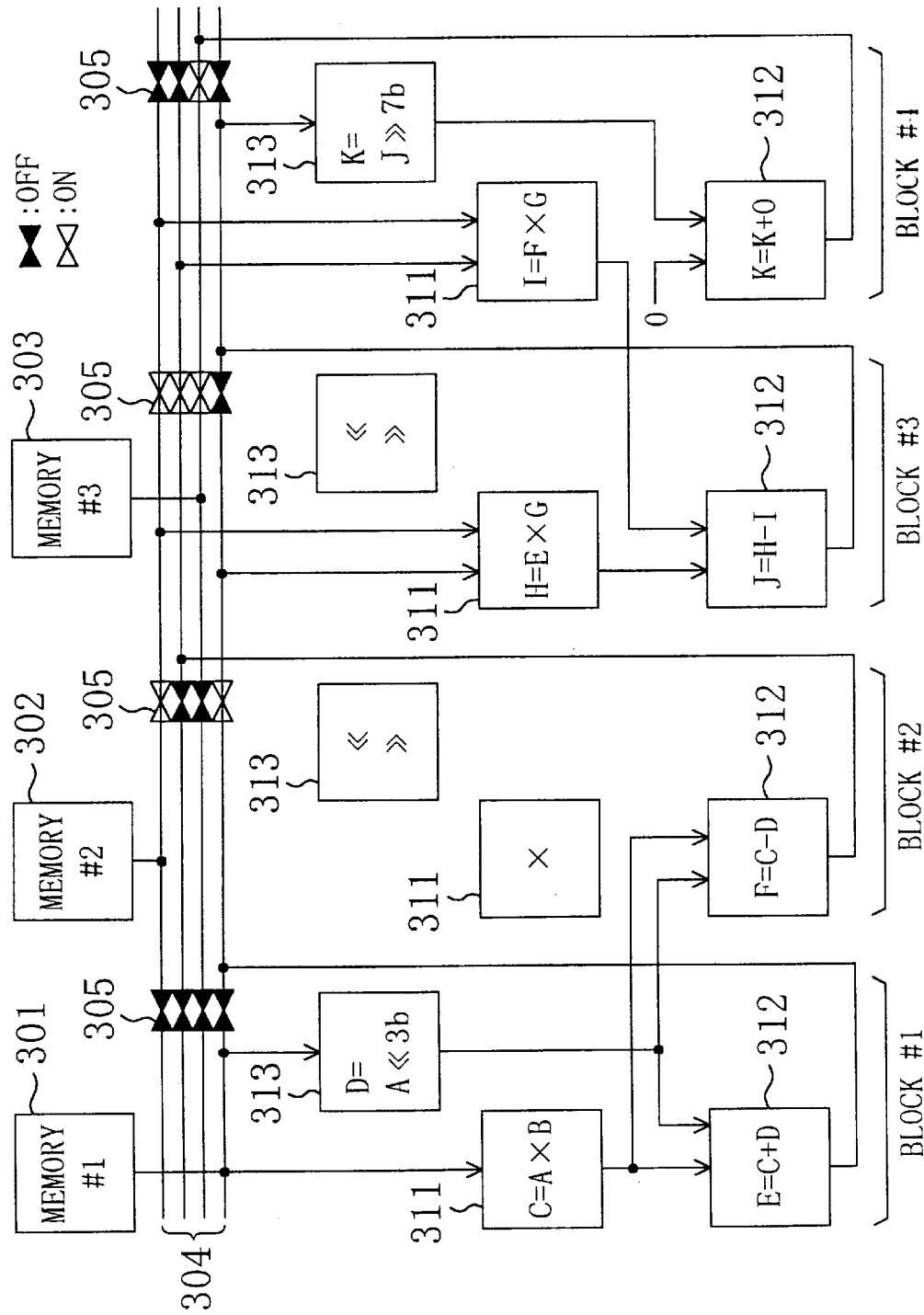
FIG. 15 shows in block diagram form an example of the structure of another reconfigurable digit-serial arithmetic system in accordance with the present invention.

FIG. 15 shows another example of the structure of the reconfigurable digit-serial arithmetic system in accordance with the present invention. A series of fixed-point arithmetic operations shown in the expressions (1)–(9) can be carried out in a pipeline manner in the digit-serial arithmetic system of FIG. 15. The digit-serial arithmetic system of FIG. 15 has a first memory 301 for providing numbers A and B, a second memory 302 for providing a number G, a third memory 303 for storing a number K, a bus 304 for data transmission, bus switches 305 for slicing the bus 304, and four arithmetic blocks (#1–#4). Each arithmetic block has a plurality of digit-serial arithmetic units (namely a digit-serial multiplier 311, a digit-serial adder/subtracter 312, and a digit-serial shifter 313) and is a combination of the foregoing structures. More specifically, each of the digit-serial multipliers 311 of FIG. 15 corresponds to the digit-serial multiplier 60 of FIG. 6, each of the digit-serial adder/subtracters 312 of FIG. 15 corresponds to the digit-serial adder/subtracter 111 of FIG. 9, and each of the digit-serial shifters 313 of FIG. 15 corresponds to the digit-serial shifter 200 of FIG. 10 with an additional input selection switch.

In the digit-serial arithmetic system of FIG. 15, the bus switches 305 can slice the bus 304 so as to form a plurality of separate paths between each digit-serial arithmetic unit. More specifically, by virtue of switching of the bus switches 305, separate transmission paths for the numbers A, B, E, F, G, J, and K are secured. The numbers C and D are distributed to the digit-serial adder/subtracter 312 of the block #1 and to the digit-serial adder/subtracter 312 of the block #2. The numbers H and I that the digit-serial adder/subtracter 312 of the block #3 requires are collected from the digit-serial multipliers 311 of the blocks #3 and #4 (see FIG. 9).

In the foregoing series of fixed-point arithmetic operations shown in the expressions (1)–(9), each of the numbers A, B, G, and L is made up of two digits, the number D is made up of three digits, each of the numbers C, E, and F is made up of four digits, the number K is made up of five digits, and each of the numbers H, I, and J is made up of six digits. The digit-serial arithmetic system of FIG. 15 can deal with these twelve numbers A–L correctly by the use of digit position indicators associated with individual digits. In addition, if the number of digits of, for example, the number B is changed, then the configuration of the digit-serial multiplier 311 of the block #1 and the digit position indicator of the number C are correspondingly changed. Furthermore, connection among the first to third memories 301–303, the digit-serial multipliers 311, the digit-serial adder/subtracters 312, and the digit-serial shifters 313 can be changed with flexibility. Accordingly, various types of arithmetic patterns can be dealt with.

In each of the above examples, one digit is made up of four bits. The number of bits forming one digit can be any integer which is greater than one.

What is claimed is:

1. A reconfigurable digit-serial arithmetic system comprising a plurality of digit-serial arithmetic units,
   wherein each of the said plurality of digit-serial arithmetic units performs the functions of:
   receiving a plurality of input digits representative of an input operand of said digit-serial arithmetic unit and a digit position indicator of each said plurality of input digits, and
   providing a plurality of result digits representative of an arithmetic result of said input operand and a digit position indicator of each of said plurality of result digits to other ones of said plurality of digit-serial arithmetic units,
   each of said plurality of digit-serial arithmetic units including a selector for selectively receiving a plurality of result digits and a digit position indicator of each of said plurality of result digits delivered from a designated one of said plurality of digit-serial arithmetic units.

2. The digit-serial arithmetic system according to claim 1, wherein at least one of said plurality of digit-serial arithmetic units is a digit-serial multiplier having a plurality of digit multipliers, and
   wherein each of said plurality of digit multipliers performs the function of performing multiplication of one digit of a plurality of multiplier digits representative of a multiplier operand, said one digit being designated by an index signal, and each of a plurality of multiplicand digits representative of a multiplicand operand.

3. The digit-serial arithmetic system according to claim 1, wherein at least one of said plurality of digit-serial arithmetic units is a digit-se rial adder/subtracter.

4. The digit-serial arithmetic system according to claim 1, wherein at least one of said plurality of digit-serial arithmetic units is a digit-serial shifter.

5. The digit-serial arithmetic system according to claim 1 further comprising:
   a bus for data transmission, and
   bus switches, each of said bus switches slicing said bus to form a plurality of separate paths between each said digit-serial arithmetic unit and any other digit-serial arithmetic unit.

* * * * *